(12) United States Patent
Kanada et al.

(10) Patent No.: US 8,605,752 B2
(45) Date of Patent: Dec. 10, 2013

(54) COMMUNICATION APPARATUS, COMMUNICATION METHOD, AND COMPUTER PROGRAM

(75) Inventors: Mizuki Kanada, Kanagawa (JP);
Toshiaki Kojima, Kanagawa (JP);
Naoki Inomata, Kanagawa (JP);
Katsuyuki Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 277 days.

(21) Appl. No.: 13/111,462

(22) Filed: May 19, 2011

(65) Prior Publication Data

US 2011/0292793 A1   Dec. 1, 2011

(30) Foreign Application Priority Data

May 27, 2010 (JP) ................................ P2010-121326

(51) Int. Cl.
*H04J 3/24* (2006.01)
(52) U.S. Cl.
USPC ............................ 370/474; 370/230; 370/412

(58) Field of Classification Search
USPC .................. 370/230, 229, 412, 471, 473, 474
See application file for complete search history.

(56) References Cited

U.S. PATENT DOCUMENTS

2009/0252162 A1    10/2009  Ohnaka
2009/0268747 A1*   10/2009  Kurata et al. ................ 370/412

FOREIGN PATENT DOCUMENTS

JP         2000 259525         9/2000

* cited by examiner

*Primary Examiner* — Huy D. Vu
*Assistant Examiner* — Dady Chery
(74) *Attorney, Agent, or Firm* — Sony Corporation

(57) ABSTRACT

A communication apparatus includes: a higher-layer processing unit that starts up a retransmission process of a corresponding packet in accordance with reception of a Duplicate ACK packet; and a lower-layer processing unit that collects a plurality of the Duplicate ACKs received through a network as one ACK and sends the one ACK to a higher layer.

15 Claims, 19 Drawing Sheets

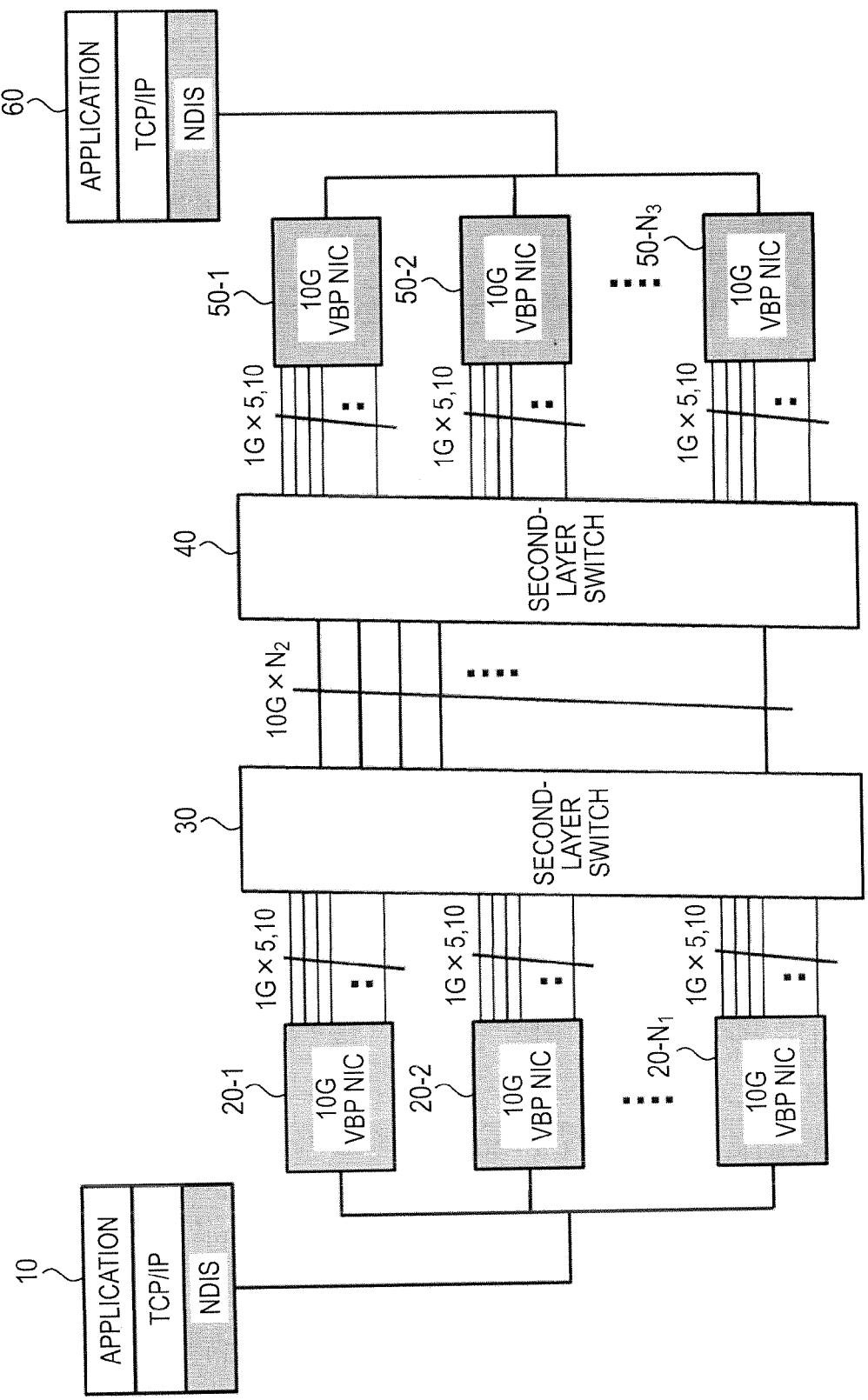

COMMUNICATION APPARATUS, COMMUNICATION METHOD, AND COMPUTER PROGRAM

BACKGROUND OF THE INVENTION

1. Field of the Invention

The present invention relates to a communication apparatus, a communication method, and a computer program, which perform data transmission in compliance with the second-layer protocol of an OSI (Open Systems Interconnection) reference model, and more particularly, to a communication apparatus, a communication method, and a computer program, which are capable of preventing a decrease in the data transmission speed in the second-layer network environment in which the order of arrived packets, which are rarely lost, is predicted to be frequently interchanged.

2. Description of the Related Art

According to an OSI reference model that is a design principle of a network structure that has been established by the International Organization for Standardization (ISO), a communication function is divided into seven layers. Among the layers, a data link layer as the second layer corresponds to a protocol that defines transmission and reception of signals between communication apparatuses that are directly or adjacently connected to each other and requests a service for a physical layer that is configured directly below the data link layer in response to a service request such as TCP/IP from a higher layer. Ethernet (registered trademark) and a token ring are representative examples of the second-layer protocol.

In addition, the second layer is divided into a logical link control (LLC) sublayer and a media access control (MAC) sublayer that is in the lower level. A route control function is not present in the second layer, and the second-layer network can be paraphrased as a range in which a MAC address can be acquired through an ARP (Address Resolution Protocol) command within the same network address or a network within a broadcast domain.

In RFC (Request For Comment) 793, technical specifications of TCP communication are represented. The TCP communication assures reliable data transmission by performing appropriate flow control such as a retransmission request for packet loss, interchange of the order, or the like at the time of the transmission. Accordingly, even in the second-layer network environment in which the order of the arrived packets is predicted to be frequently interchanged, an appropriate process is performed in accordance with the TCP protocol, and accordingly, an application is provided with data in the right order.

In addition, according to the TCP, there are two retransmission functions, which are defined in RFC2851 "TCP Congestion Control", as below.

(1) A TCP receiver SHOULD send an immediate duplicate ACK when ban out-of-order segment arrives.

(2) The TCP sender SHOULD use the "fast retransmit" algorithm to detect and repair loss, based on incoming duplicate ACKs. The fast retransmit algorithm uses the arrival of 3 duplicate ACKs (4 identical ACKs without the arrival of any of other intervening packets) as an indication that a segment has been lost.

This fast retransmit function is a very effective tool for performing retransmission due to a packet loss. It is rare that a packet is lost in the second-layer network, that is, communication within the same network address. However, within the second-layer network, while a packet is not lost, the order of packet is operated so as to be frequently interchanged, the TCP receiver side transmits an unnecessary Duplicate ACK, and the TCP sender performs an unnecessary retransmission process in response thereto. As a result, the network performance is remarkably degraded.

For example, a response returning method is proposed in which the number of processes of ACKs is decreased by collecting several ACKs in a buffer and then transmitting the ACKs (for example, see JP-A-2000-259525). However, this method is assumed to be performed inside the TCP, and, in order to realize the method, it is necessary to change a TCP/IP protocol stack. Since the source of the TCP/IP protocol stack may not be open depending on the OS vendor, there are many cases where it is difficult to modify the TCP/IP protocol stack.

SUMMARY OF THE INVENTION

It is desirable to provide a superior communication apparatus, a communication method, and a computer program, which are capable of preventing the data transmission speed from decreasing without changing the TCP/IP protocol stack in the second-layer network environment in which a packet loss is rare, but the order of arrived packets is predicted to be frequently interchanged.

According to an embodiment of the present invention, there is provided a communication apparatus including: a higher-layer processing unit that starts up a retransmission process of a corresponding packet in accordance with reception of a Duplicate ACK packet; and a lower-layer processing unit that collects a plurality of the Duplicate ACKs received through a network as one ACK and sends the one ACK to a higher layer.

In the above-described communication apparatus, the lower-layer processing unit may collect the Duplicate ACK packets, of which original IP addresses and port numbers are respectively the same, for packets acquired by segmenting a same Conversation as one.

In addition, in the above-described communication apparatus, when receiving the Duplicate ACK packet, the lower-layer processing unit may start a timer, maintain the Duplicate ACK packet, collect a plurality of the Duplicate ACK packets, which have been received until the timer is timed out, as one packet, and send the one packet to the higher layer processing unit.

According to another embodiment of the present invention, there is provided a communication method for a communication apparatus including a higher-layer processing unit that starts up a retransmission process of a corresponding packet in accordance with reception of a Duplicate ACK packet and a lower-layer processing unit that performs a communication protocol process that is lower than that of a higher layer. The communication method includes the steps of: receiving the Duplicate ACK packet through a network by using the lower-layer processing unit; maintaining the Duplicate ACK packet received by the lower-layer processing unit; and collecting a plurality of Duplicate ACK packets maintained by the lower-layer processing unit as one packet and sending the one packet to the higher-layer processing unit.

According to still another embodiment of the present invention, there is provided a computer program that is described in a computer-readable format so as to perform a process for data communication on a computer. The computer program allows the computer to serve as: a higher-layer processing unit that starts up a retransmission process of a corresponding packet in accordance with reception of a Duplicate ACK packet; and a lower-layer processing unit that collects a plurality of the Duplicate ACKs received through a network as one ACK and sends the one ACK to a higher layer.

According to the above-described computer program, a computer program is described in a computer-readable form so as to realize a predetermined process on a computer. In other words, by installing the above-described computer program to a computer, a cooperative operation is performed on the computer, whereby the same operations and advantages as those of the above-described communication apparatus can be acquired.

According to yet another embodiment of the present invention, there is provided a communication apparatus including: a higher-layer processing unit that generates a Duplicate ACK packet and starts up a retransmission process in accordance with reception of an out-of-order packet; and a lower-layer processing unit that collects a plurality of the Duplicate ACK packets received from the higher-layer processing unit as one packet and sends the one packet to a network.

In the above-described communication apparatus, the lower-layer processing unit may collect the Duplicate ACK packets, of which original IP addresses and port numbers are respectively the same, acquired by segmenting a same Conversation as one.

In addition, in the above-described communication apparatus, when receiving the Duplicate ACK packet from the higher-layer processing unit, the lower-layer processing unit may start a timer, maintain the Duplicate ACK packet, collect a plurality of the Duplicate ACK packets, which have been received until the timer is timed out, as one packet, and transmit the one packet to the network.

According to still yet another embodiment of the present invention, there is provided a communication method for a communication apparatus including a higher-layer processing unit that generates a Duplicate ACK packet and starts up a retransmission process in accordance with reception of an out-of-order packet and a lower layer processing unit that performs a communication protocol process that is lower than that of the higher layer. The communication method includes the steps of: receiving a Duplicate ACK packet from the higher-layer processing unit by using the lower-layer processing unit; maintaining the Duplicate ACK packet received by the lower-layer processing unit; and collecting a plurality of the Duplicate ACK packets maintained by the lower-layer processing unit as one packet and transmitting the one packet to a network.

According to further another embodiment of the present invention, there is provided a computer program that is described in a computer-readable format so as to perform a process for data communication on a computer. The computer program allows the computer to serve as: a higher-layer processing unit that generates a Duplicate ACK packet and starts up a retransmission process in accordance with reception of an out-of-order packet; and a lower-layer processing unit that collects a plurality of the Duplicate ACK packets received from the higher-layer processing unit as one packet and sends the one packet to a network.

According to the above-described computer program, a computer program is described in a computer-readable form so as to realize a predetermined process on a computer. In other words, by installing the above-described computer program to a computer, a cooperative operation is performed on the computer, whereby the same operations and advantages as those of the above-described communication apparatus can be acquired.

According to further another embodiment of the present invention, there is provided a communication apparatus including: a higher-layer processing unit that generates a Duplicate ACK packet and starts up a retransmission process in accordance with reception of an out-of-order packet; and a lower-layer processing unit that sorts packets received through a network in a correct order and sends the packets to the higher-layer processing unit.

In the above-described communication apparatus, when reception of a plurality of packets, of which original IP addresses and port numbers are respectively the same, acquired by segmenting a same Conversation is out of order, the lower-layer processing unit may sort the packets in a correct order.

In addition, in the above-described communication apparatus, when receiving out-of-order packets, the lower-layer processing unit may start up a timer, maintain the out-of-order packets, sort the maintained packets in a correct order, and send the received packets that are difficult to be sorted in the correct order until the timer is timed out to the higher-layer processing unit.

According to still further another embodiment of the present invention, there is provided a communication method for a communication apparatus including a higher-layer processing unit that generates a Duplicate ACK packet and starts up a retransmission process in accordance with reception of out-of-order packets and a lower-layer processing unit that performs a communication protocol process that is lower than that of a higher layer. The communication method includes the steps of: receiving a packet through a network by using the lower-layer processing unit; maintaining packets that are difficult to be received by the lower-layer processing unit in a correct order; and storing the packets received by the lower-layer processing unit and the maintained packets in a correct order and sending the packets to the upper-layer processing unit.

According to yet further another embodiment of the present invention, there is provided a computer program that is described in a computer-readable format so as to perform a process for data communication on a computer. The computer program allowing the computer to serve as: a higher-layer processing unit that generates a Duplicate ACK packet and starts up a retransmission process in accordance with reception of out-of-order packets; and a lower-layer processing unit that sorts packets received through a network in a correct order and sends the packets to the upper-layer processing unit.

According to the above-described computer program, a computer program is described in a computer-readable form so as to realize a predetermined process on a computer. In other words, by installing the above-described computer program to a computer, a cooperative operation is performed on the computer, whereby the same operations and advantages as those of the above-described communication apparatus can be acquired.

According to the embodiments of the present invention, the decrease in the data transmission speed can be suppressed by suppressing the startup of an unnecessary retransmission process in a second-layer network environment without changing the TCP/IP protocol stack.

According to the embodiments of the present invention, in the second-layer network environment in which a packet loss is rare, the decrease in the data transmission speed can be prevented by suppressing the startup of an unnecessary retransmission process due to the interchange of arrived packets in the order.

According to some of the above-described embodiments of the present invention, since a Duplicate ACK integrating process of collecting a plurality of received Duplicate ACKs as one is performed in the layer lower than the TCP/IP of the data transmission side (the ACK reception side), the decrease in the data transmission speed due to TCP/IP flow control can be suppressed to be minimal without changing the TCP/IP protocol stack.

According to some of the above-described embodiments of the present invention, since a Duplicate ACK integrating process of collecting a plurality of transmitted Duplicate ACKs as one is performed in the layer lower than the TCP/IP of the data reception side (the ACK transmission side), the decrease in the data transmission speed due to TCP/IP flow control can be suppressed to be minimal without changing the TCP/IP protocol stack.

According to some of the above-described embodiments of the present invention, since a packet sorting process of sorting received packets in a correct order is performed in the layer lower than the TCP/IP of the data reception side, the decrease in the data transmission speed due to TCP/IP flow control can be suppressed to be minimal without changing the TCP/IP protocol stack.

Further objects, features, and advantages of some embodiments of the present invention will become apparent through the detailed description of the embodiments presented with reference to the accompanying drawings.

BRIEF DESCRIPTION OF THE DRAWINGS

FIG. 4A is a diagram illustrating a configuration example of a network system in which the transmission frame control function illustrated in FIG. 2 is built in the form of a network interface card.

DESCRIPTION OF THE PREFERRED EMBODIMENTS

Hereinafter, embodiments of the present invention will be described in detail with reference to the accompanying drawings.

In standard specifications "IEEE802.1 AX-2008 Link Aggregation" relating to a network multi-link technology, a link aggregation is defined. A plurality of links are integrated in the form of a link aggregation group, so that a MAC client handles the link aggregation group as a single link. However, in the above-described specifications, limitation is applied to segmentation technology and modification of a transmission frame, and accordingly, it is difficult to perform multi-link transmission of the same Conversation. In such a case, the Conversation is not segmented and distributed to a plurality of links, and there is no problem relating to the order of arrived packets.

The Conversation described here corresponds to a session of the TCP, and an application is one stream having one purpose. The Conversation, for example, can be defined as a combination of a transmission source IP address, a transmission source port number, a destination IP address, and a destination port number. Generally, a link and a client have one-to-one correspondence, and a case where a client uses a plurality of links is not considered. Since the limitation is applied to the segmentation technology, it is difficult to segment one stream so as to be distributed to a plurality of links, that is, multi-link.

In contrast to this, in the specification of JP-A-2010-31985 assigned to the assignee of this application, a method for realizing link aggregation or multi-links at the time of transmitting a single Conversation by adding a transmission frame control function to a server-client type network system is disclosed. In the description here, the transmission frame control function is also referred to as a "Virtual Big Pipe: VBP". When the VBP is applied to the second-layer network, packets acquired by dividing the Conversation is distributed to a plurality of links, and, in the second-layer network environment, although the occurrence of a packet loss is rare, the frequent occurrence of the interchange of arrived packets in the order is predicted.

Here, the VBP function will be described with reference to a sever-client type network system shown in FIG. 1 as an example.

Figure 1:
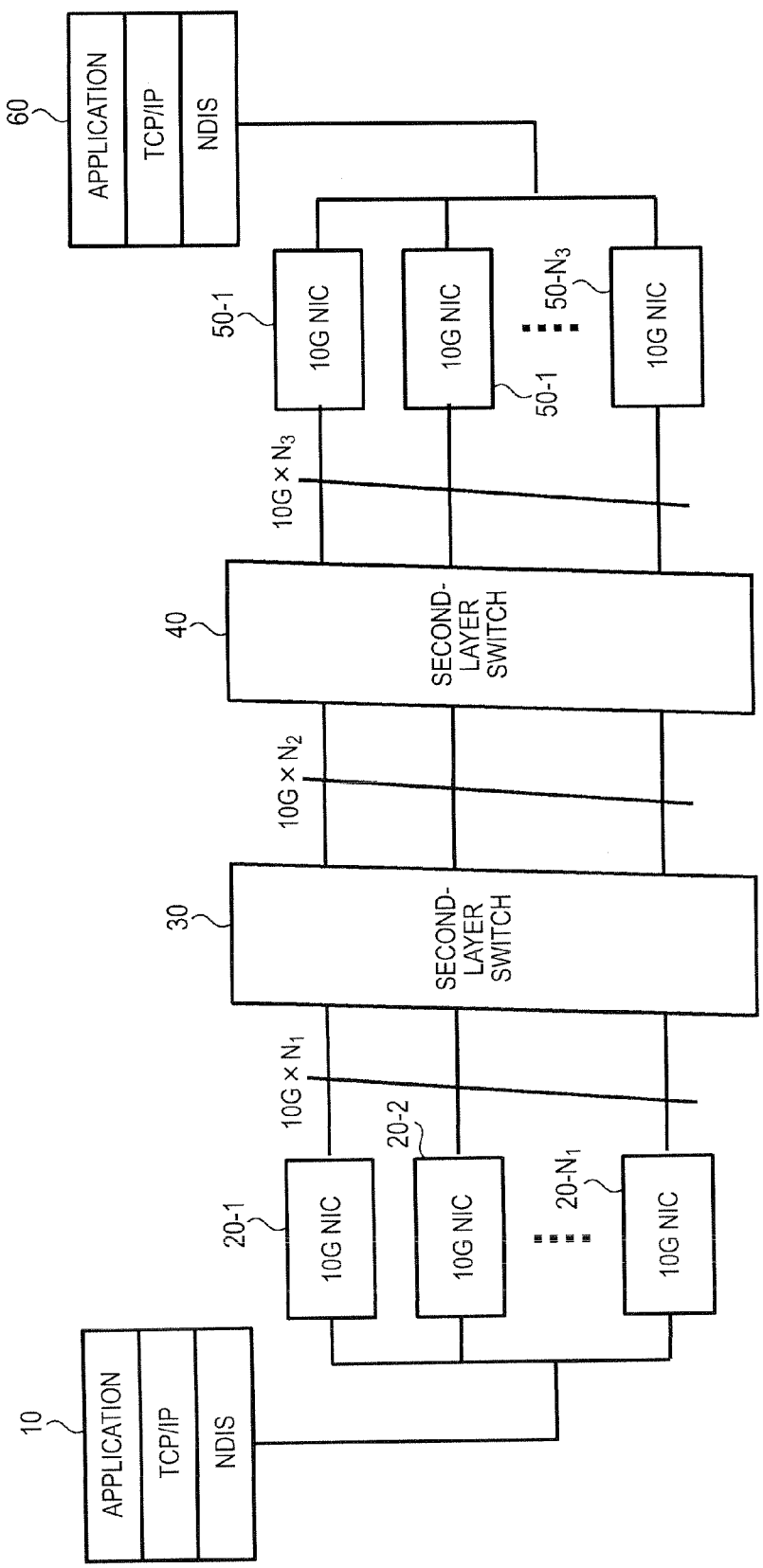
FIG. 1 is a diagram illustrating a configuration example of a network system in which a server and a client are connected through two second-layer switches.

In the network system shown in FIG. 1, a server 10 and a client 60 are connected to each other through two second-layer switches 30 and 40. In a case where the server 10 and the client 60 are, for example, configured by computers in which "Windows (registered trademark)" is mounted as an operating system (OS), the communication protocol thereof has a layered structure in which an application, a TCP/IP, a driver (Network Driver Interface Specification: NDIS) are sequentially stacked from the upper side.

The server 10 is equipped with $N_1$ network interface cards (NICs) 20-1, 20-2, ... and is connected with the second-layer switch 30 through $N_1$ 10 Gbps Ethernet (registered trademark) links. Although the bandwidth of each independent link that connects the server 10 and the second-layer switch 30 is 10 Gbps, when the link aggregation is realized, a bandwidth higher than $10 \times N_1$ Gbps as a total bandwidth of maximum $N_1$ links can be acquired.

In addition, the second-layer switches 30 and 40 are connected through $N_2$ 10 Gbps Ethernet (registered trademark) links. Although the bandwidth of each independent link that connects the second-layer switches 30 and 40 is 10 Gbps, when the link aggregation is realized, a bandwidth higher than $10 \times N_2$ Gbps as a total bandwidth of maximum $N_2$ links can be acquired.

On the other hand, the client 60 is equipped with $N_3$ 10 Gbps network interface cards (NICs) 50-1, 50-2, ... and is connected with the second-layer switch 40 through $N_3$ 10 Gbps Ethernet (registered trademark) links. Although the bandwidth of each independent link that connects the server 60 and the second-layer switch 40 is 10 Gbps, when the link aggregation is realized, a bandwidth higher than $10 \times N_3$ Gbps as a total bandwidth of maximum $N_3$ links can be acquired.

Figure 2:
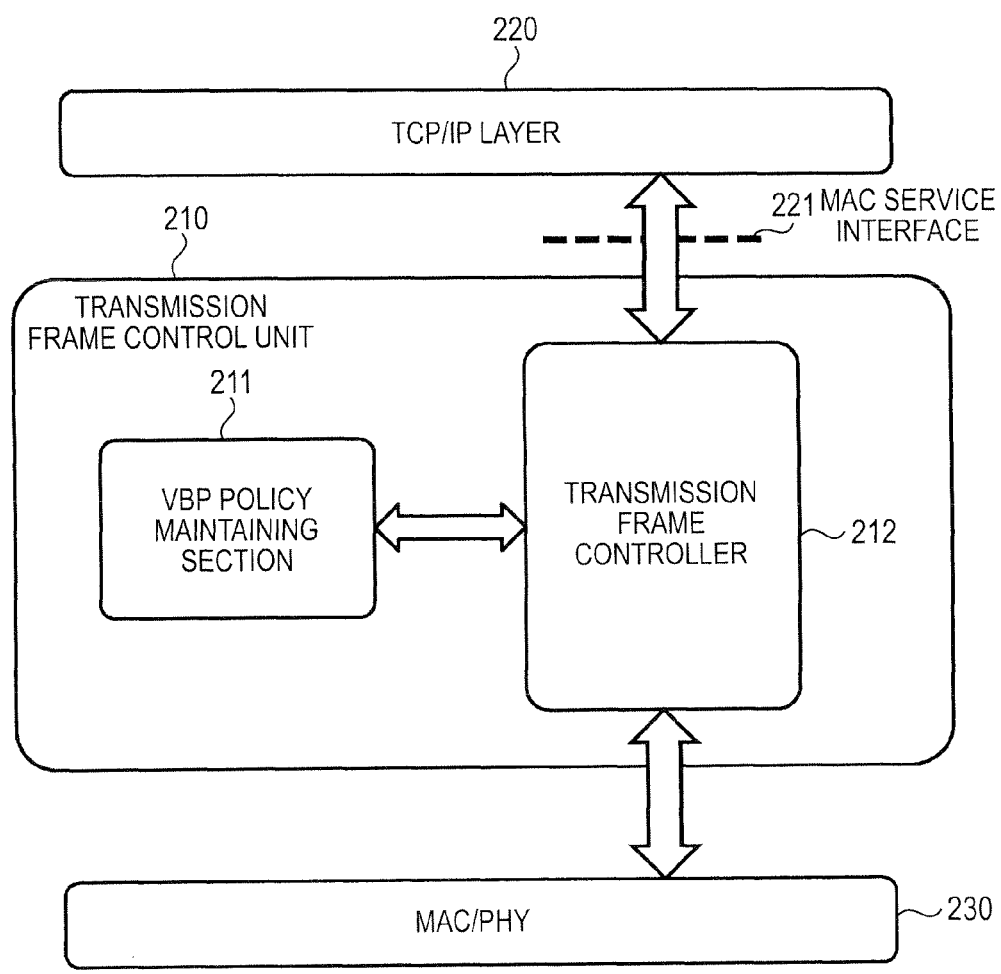
FIG. 2 is a block diagram schematically illustrating the configuration of a transmission frame control unit.

In the network system shown in FIG. 1, by disposing a transmission frame control unit 210 shown in FIG. 2 between a TCP/IP layer 220 and a MAC/PHY layer 230 in each of the server 10 and the client 20, the link aggregation or multi-links at the time of transmitting a single Conversation can be realized. In addition, generally, between the TCP/IP layer 220 and the MAC/PHY layer 230 corresponds to a MAC service interface 221. The transmission frame control unit 210 can be mounted as a driver or a network interface card.

The transmission frame control unit 210 includes a VBP policy maintaining section 211 and a transmission frame controller 212 and provides a frame transmission control function for the second-layer protocol. The VBP policy maintaining section 211 stores a VBP policy set for each Conversation. The transmission frame controller 212 changes the transmission frame of each Conversation in accordance with the VBP policy that is set in the VBP policy maintaining section 211. As described later, the transmission frame after change is transmitted as data through multi-links between network routes in the second-layer network environment.

The VBP policy maintaining section 211 maintains the VBP policy dynamically or statically. In addition, each VBP policy is set by the VBP policy maintaining section 211 manually or automatically. For example, the VBP policy may be configured so as to automatically set based on the analysis of a result of monitoring the data flow or the like.

The VBP policy described here is configured by a combination of an input condition that is configured by information of the transmission source or the destination of a transmission frame and the like and a control policy used for changing the transmission frame in accordance with the input condition. The change for the transmission frame includes, for example, addition of a VLAN (Virtual LAN) tag, a change of the MAC address of the transmission source, a change of the destination MAC address, or the like.

Table 1 shown below illustrates an example of set items that are maintained in the VBP policy maintaining section 211.

TABLE 1

| Input Condition | | | | | Control Policy | | | |
|---|---|---|---|---|---|---|---|---|
| Source | | Destination | | | | Source | Destination | |
| MAC Address | Port No. | MAC Address | IP Address | Port No. | Control Rules | MAC Address | MAC Address | VLAN ID |

In the table shown above, the input condition includes a source section that is configured by the MAC address and the port number of the transmission source set for the corresponding Conversation and a destination section that is configured by the MAC address, the IP address, and the port number of the recipient of the transmission frame.

In addition, the control policy is configured by items of the MAC address of the transmission source, the MAC address of the destination, and the VLAN ID, which are to be changed (assigned) for a transmission frame satisfying the input condition, and a Control Rule section that designates the assignment rule when the MAC address of the transmission source, the MAC address of the destination, and the VLAN ID are assigned to the corresponding transmission frame. In the embodiment to be described later, although only Sequential Assignment (SA) is represented as the control rule, a rule such as "assignment at the time of detecting a defect", "assignment for a request for a priority or a bandwidth", or the like can be described.

When receiving a transmission frame from the TCP/IP layer 220 as a higher layer through the MAC service interface 221, the transmission frame controller 212 analyzes the content of the header information and the like and refers to the set item maintained in the VBP policy maintaining section 211. Then, when a set item that has the input condition coinciding with the header information of the transmission frame is found, the transmission frame controller 212 changes the transmission MAC address, the MAC address of the destination, and the VLAN ID of the transmission frame in accordance with the assignment rule described as a control policy of the set item and sends them to the MAC/PHY layer as a lower layer 230. As a result, when a single Conversation is transmitted, the link aggregation can be realized by assigning a plurality of transmission frames to a plurality of links. Although the bandwidth of each link is 10 Gbps, as a total bandwidth of a plurality of links to which the transmission frame is assigned, for example, a bandwidth that is higher than 40 to 100 Gbps can be acquired.

Through the VBP function, multi-links at the time of transmitting a single Conversation are realized, and the network can be operated with a higher band by combining a plurality of links having a lower band.

Figure 3A:
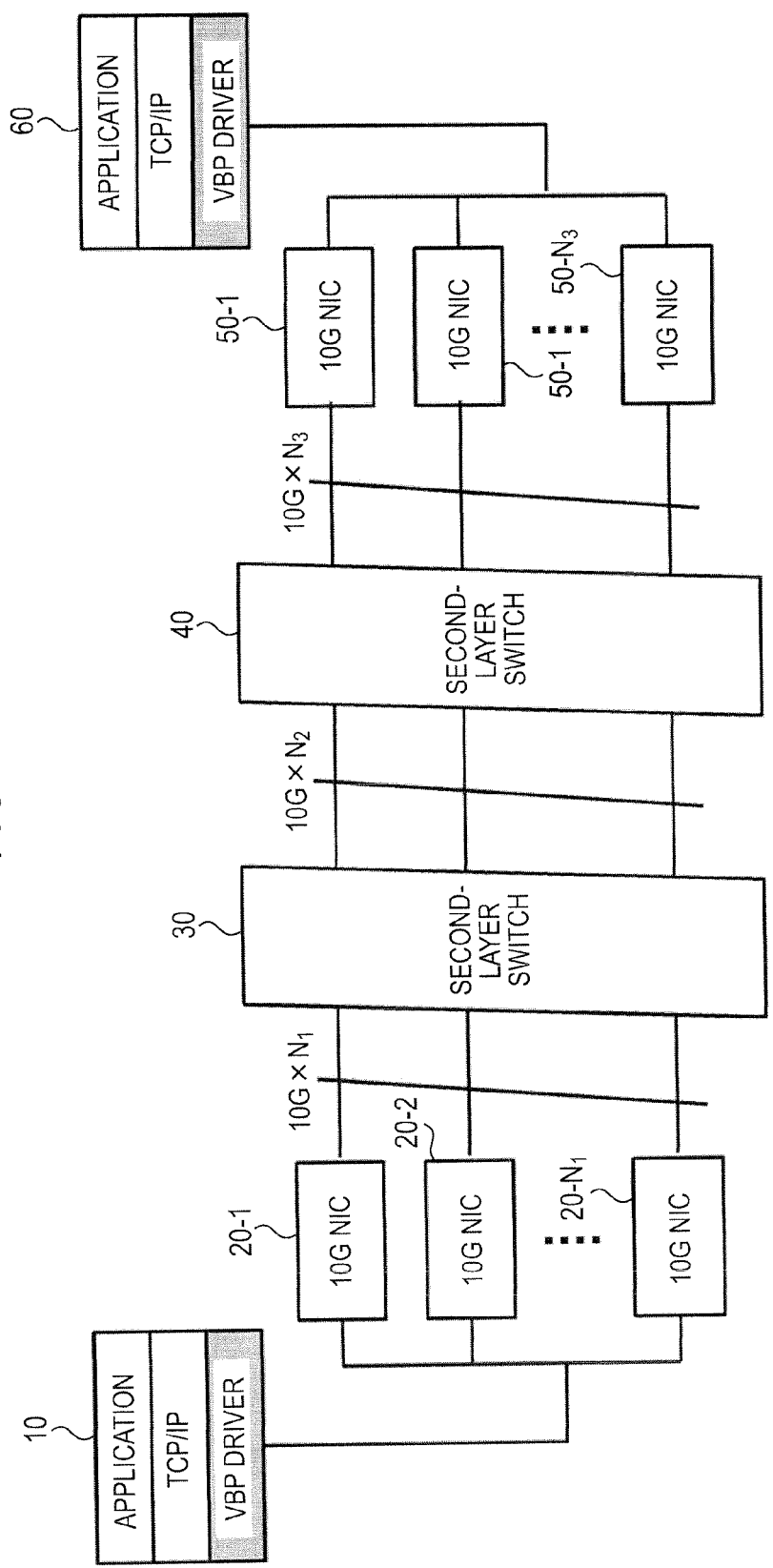
FIG. 3A is a diagram illustrating a configuration example of a network system in which the transmission frame control function illustrated in FIG. 2 is built in the form of a driver.

FIG. 3A illustrates a configuration example of a network system in which the transmission frame control function illustrated in FIG. 2 is built in the form of software that is a driver. The VBP driver that is included in each of the server 10 and the client 60 in the figure performs a transmission frame control (VBP) function, in other words, serves as the VBP policy maintaining section 211 and the transmission frame controller 212 described above.

Figure 3B:
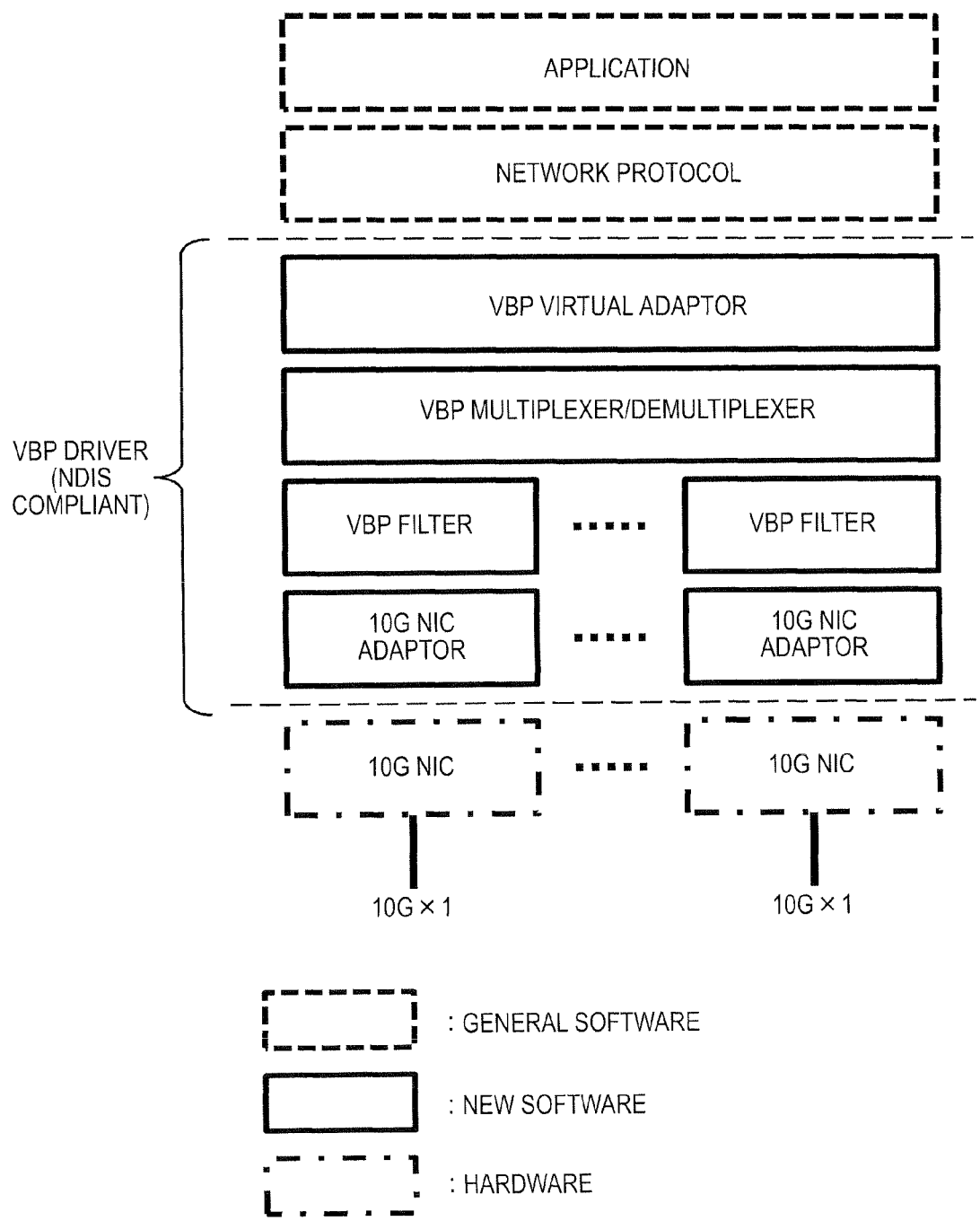
FIG. 3B is an exemplary diagram illustrating the protocol stack structure on a Windows (registered trademark) OS in a case where the transmission frame control function illustrated in FIG. 2 is built in the form of a driver, as illustrated in FIG. 3A.

FIG. 3B is illustrates the protocol stack structure on a Windows (registered trademark) OS as an example in a case where the transmission frame control function is built in the form of software that is a VBP driver, as illustrated in FIG. 3A. In the figure, functional modules that can be configured by general software, functional modules that are configured by new software, and functional modules that are configured by hardware are separately represented. A protocol stack that is configured by an VBP virtual adaptor, a VBP multiplexer/demultiplexer, a VBP filter, and an NIC adapter configures the VBP driver and is assumed to be in compliance with the standard specifications "NDIS" of the network driver that is defined by Microsoft Corp. (USA). For example, in a case where four 10 Gbps network interface cards are used, throughput of 40 Gbps can be realized as a total bandwidth of multi-links.

FIG. 4A illustrates a configuration example of a network system in which the transmission frame control function illustrated in FIG. 2 is built in the form of hardware that is a network interface card. The VBP network interface card that is included in each of the server 10 and the client 60 in the figure performs a transmission frame control (VBP) function, in other words, serves as the VBP policy maintaining section 211 and the transmission frame controller 212 described above.

Figure 4B:
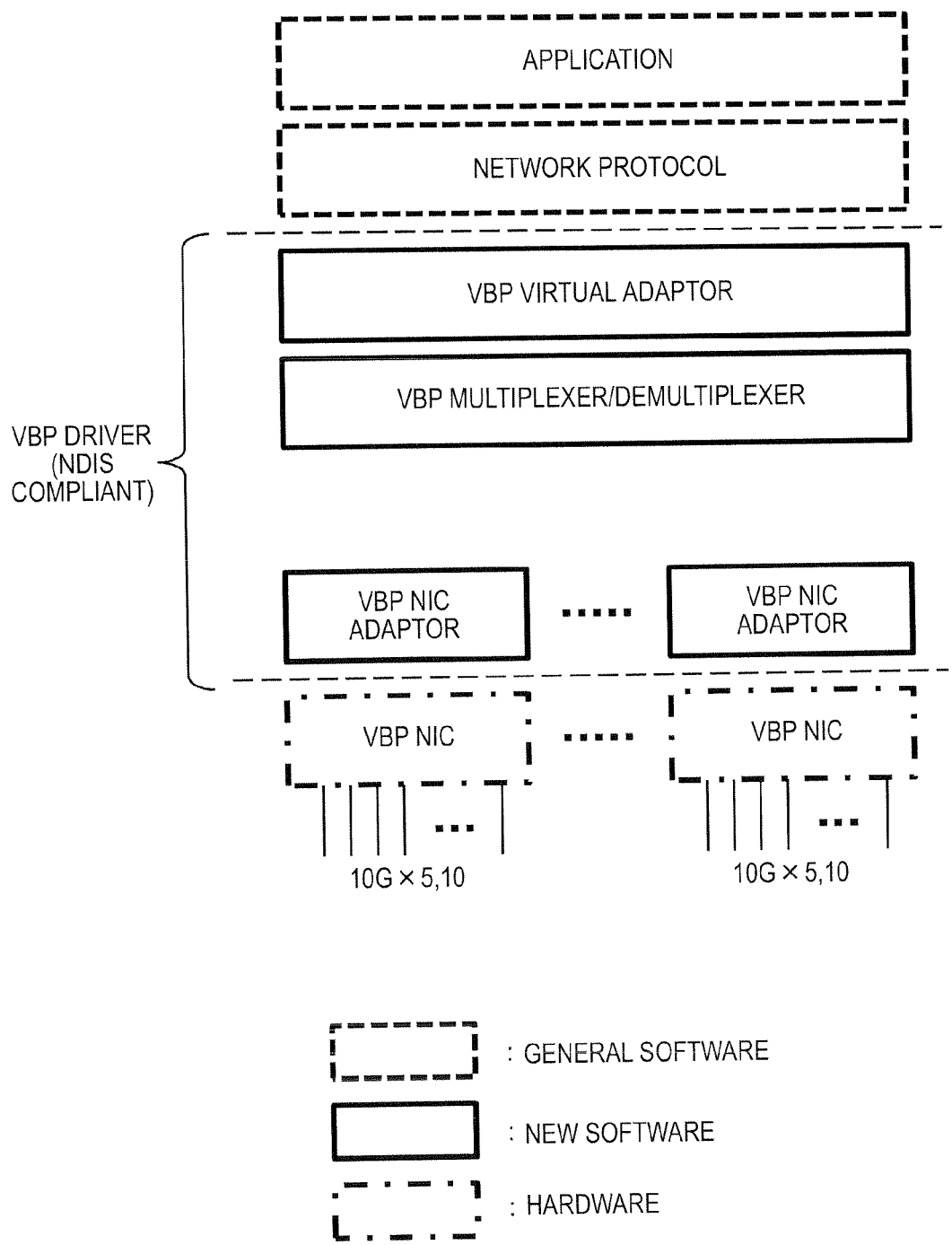
FIG. 4B is an exemplary diagram illustrating the protocol stack structure on a Windows (registered trademark) OS in a case where the transmission frame control function illustrated in FIG. 2 is built in the form of a network interface card, as illustrated in FIG. 4A.

FIG. 4B illustrates the protocol stack structure on a Windows (registered trademark) OS as an example in a case where the transmission frame control function is built in the form of hardware that is a VBP network interface card, as illustrated in FIG. 4A. In the figure, functional modules that can be configured by general software, functional modules that are configured by new software, and functional modules that are configured by hardware are separately represented. A protocol stack that is configured by an VBP virtual adaptor, a VBP multiplexer/demultiplexer, and a VBP NIC adapter configures the VBP driver and is assumed to be in compliance with the standard specifications "NDIS" (as described above). For example, in a case where each VBP network interface card includes five or ten virtual links of 1 Gbps, and four or eight VBP network interface cards are used, throughput of 40 Gbps can be realized as a total bandwidth of multi-links.

Figure 5:
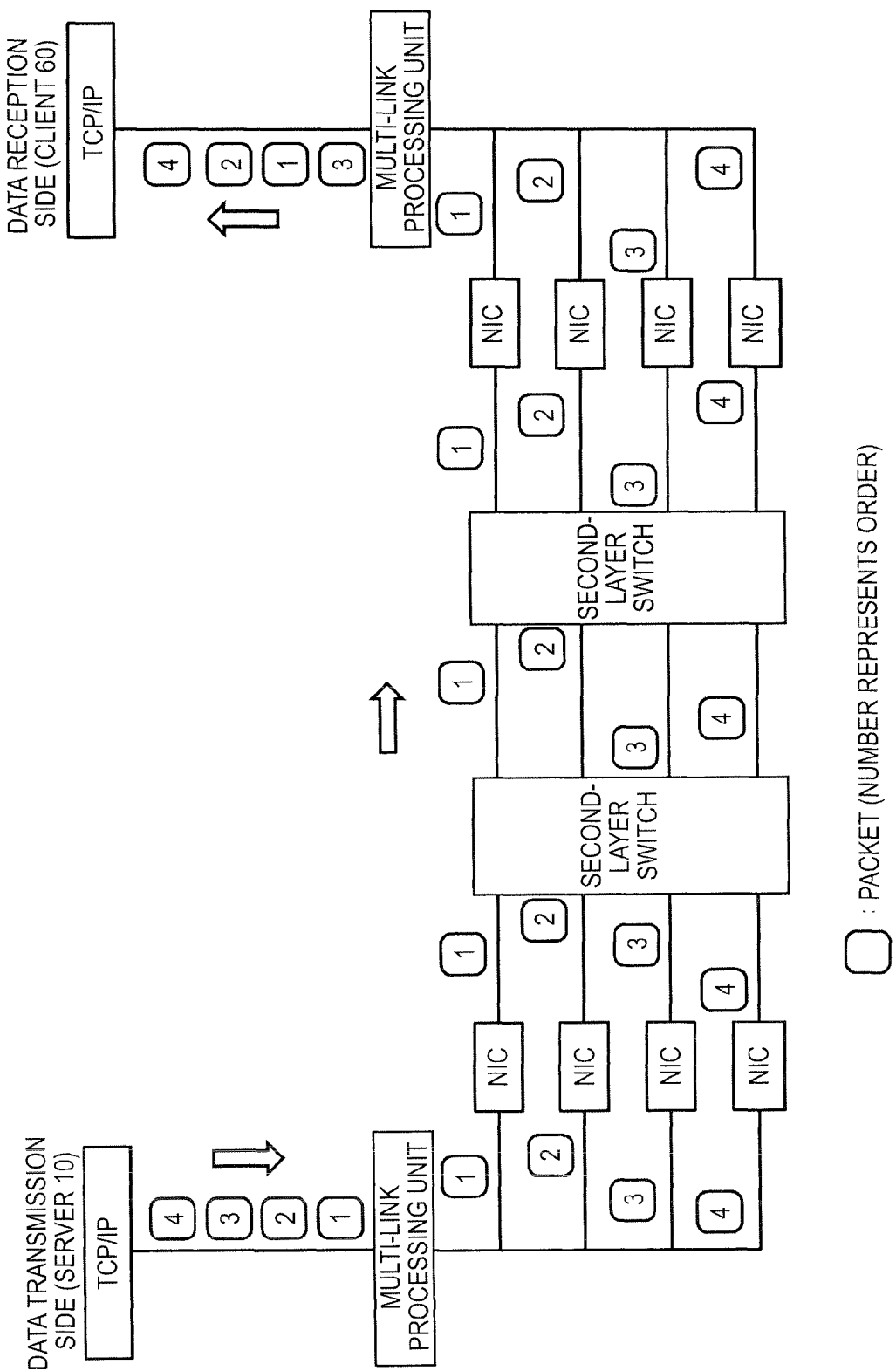
FIG. 5 is a diagram illustrating the appearance of occurrence of interchange arrived packets in the order in a second-layer network to which a VBP function is applied.

When the VBP as illustrated in FIGS. 2 to 4 is applied to the second-layer network, by segmenting a Conversation so as to be distributed to a plurality of links, in the second-layer environment, the loss of the packet is rare, but it is predicted that the interchange of the arrived packets in the order frequently occurs. FIG. 5 illustrates the appearance of occurrence of interchange of arrived packets in the order in a second-layer network to which the VBP function is applied.

In a case where the computer of the server 10 that is on the transmission side is configured by multiple CPUs (Central Processing Unit), and the transmission frame control unit that realizes multi-links is mounted as multi-threads, a packet received from the TCP/IP of the higher layer (a packet acquired by segmenting the Conversation) is distributed to each NIC, and, at that time, there is a possibility that the order of packets is changed. In addition, for the second-layer switch disposed on the network route, since each port is independently operated, there is a possibility that the order of the packets changes depending on the network loads. As a result, the TCP/IP of the computer on the client side 60 that is the reception side receives packets of which the order is changed.

It is rare that a packet is lost in the second-layer network. However, when the interchange of the order of the packets frequently occurs, as illustrated in FIG. 5, the client 60 as the reception side transmits an unnecessary Duplicate ACK. In addition, the server 10 as the transmission side performs an unnecessary retransmission process in response to the unnecessary Duplicate ACK. As a result, the network performance is remarkably degraded.

Accordingly, the inventors of the present invention found that the decrease in the data transmission speed due to the TCP/IP flow control can be suppressed to be a minimum by adding any one or a combination of the functions described below to the second-layer network.

(1) a Duplicate ACK integrating function of collecting a plurality of received Duplicate ACK packets as one performed in a layer lower than that of the TCP/IP of the data transmission side (the ACK reception side)

(2) a Duplicate ACK integrating function of collecting a plurality of Duplicate ACK packets to be transmitted as one performed in a layer lower than that of the TCP/IP of the data reception side (the ACK transmission side)

(3) a packet sorting function of sorting the received packets in a correct order performed in the layer lower than that of the TCP/IP of the data reception side First, an embodiment will be described in which the Duplicate ACK function is added to the data transmission side (the ACK reception side).

Figure 6:
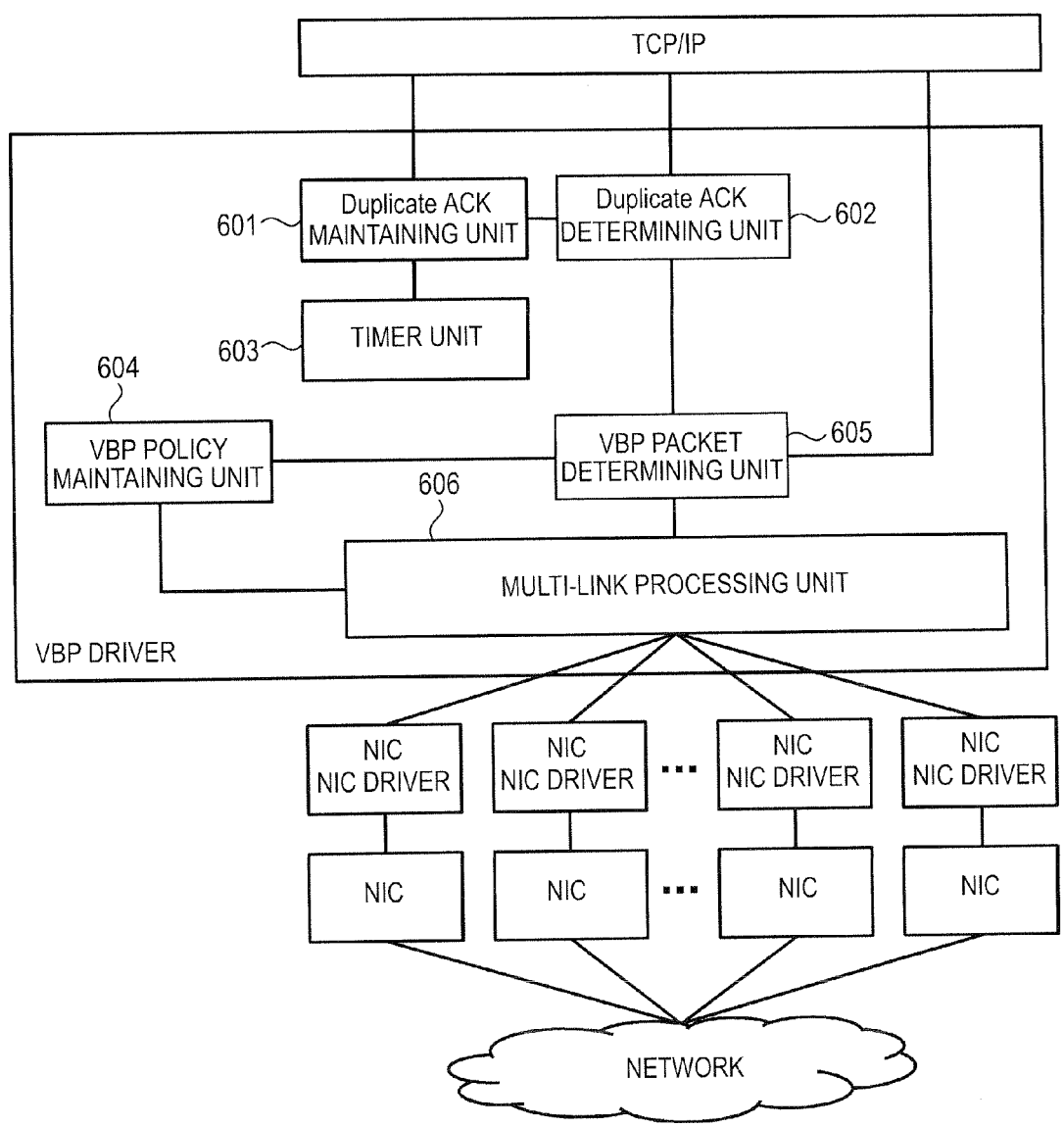
FIG. 6 is a diagram illustrating the functional configuration in which a Duplicate ACK integrating function is added to a transmission-side (server) VBP driver.

FIG. 6 illustrates the functional configuration in which the Duplicate ACK integrating function of collecting a plurality of received Duplicate ACK packets as one is added to the transmission-side (server 10) VBP driver in a case where the transmission frame control function is built in the form of a driver as illustrated in FIG. 3A. In addition, FIG. 7 illustrates the functional configuration in which the Duplicate ACK integrating function is added to the transmission-side (server 10) VBP NIC in a case where the transmission frame control function is built in the form of a network interface card as illustrated in FIG. 4A.

Figure 7:
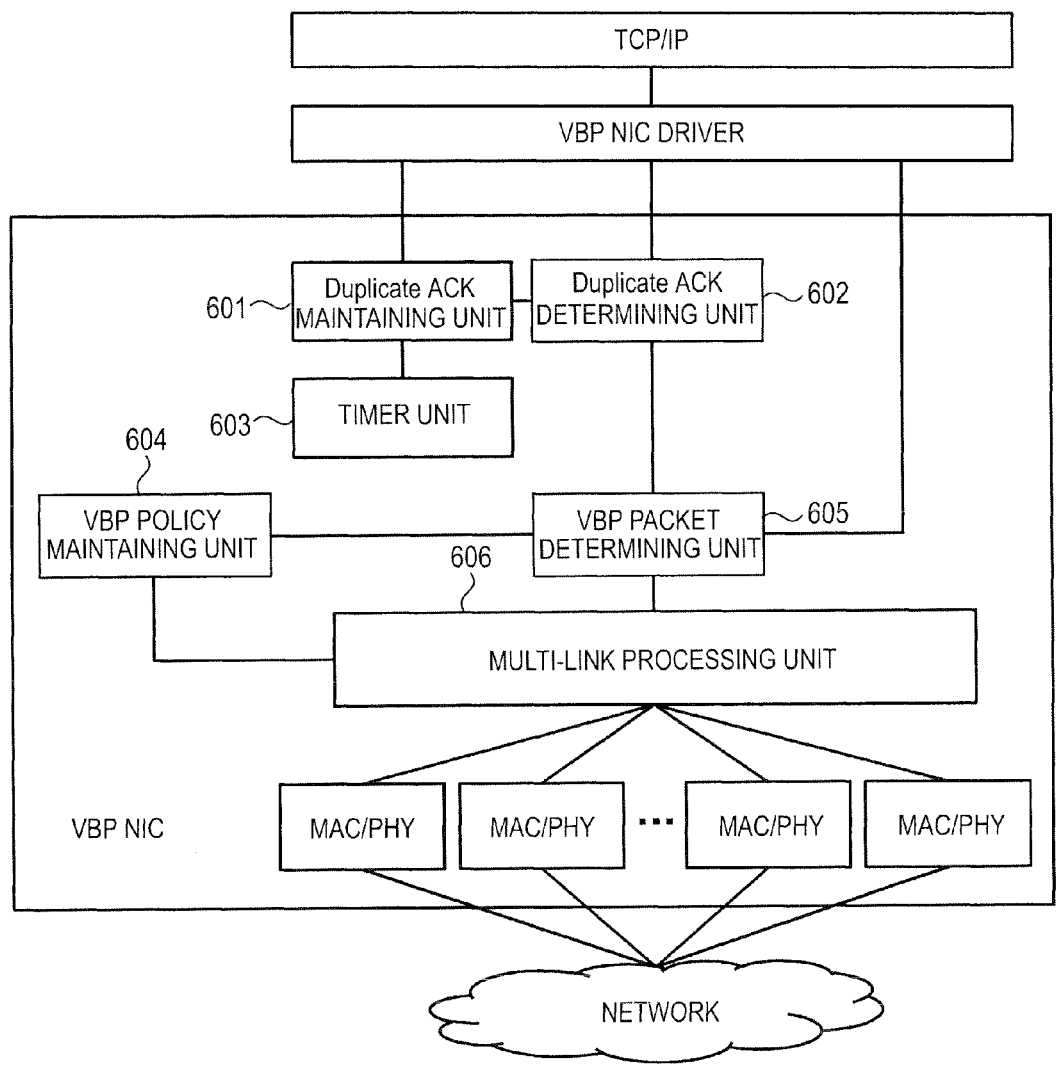
FIG. 7 is a diagram illustrating the functional configuration in which a Duplicate ACK integrating function is added to a transmission-side (server) VBP NIC.

The VBP driver shown in FIG. 6 and the VBP NIC shown in FIG. 7 includes a Duplicate ACK maintaining unit 601, a Duplicate ACK determining unit 602, a timer unit 603, a VBP policy maintaining unit 604, a VBP packet determining unit 605, and a multi-link processing unit 606. In FIGS. 6 and 7, each of the functional modules denoted by reference numerals 601 to 606 basically performs the same operation, and there is only a difference in whether the function is realized in a software form or a hardware form.

Figure 8:
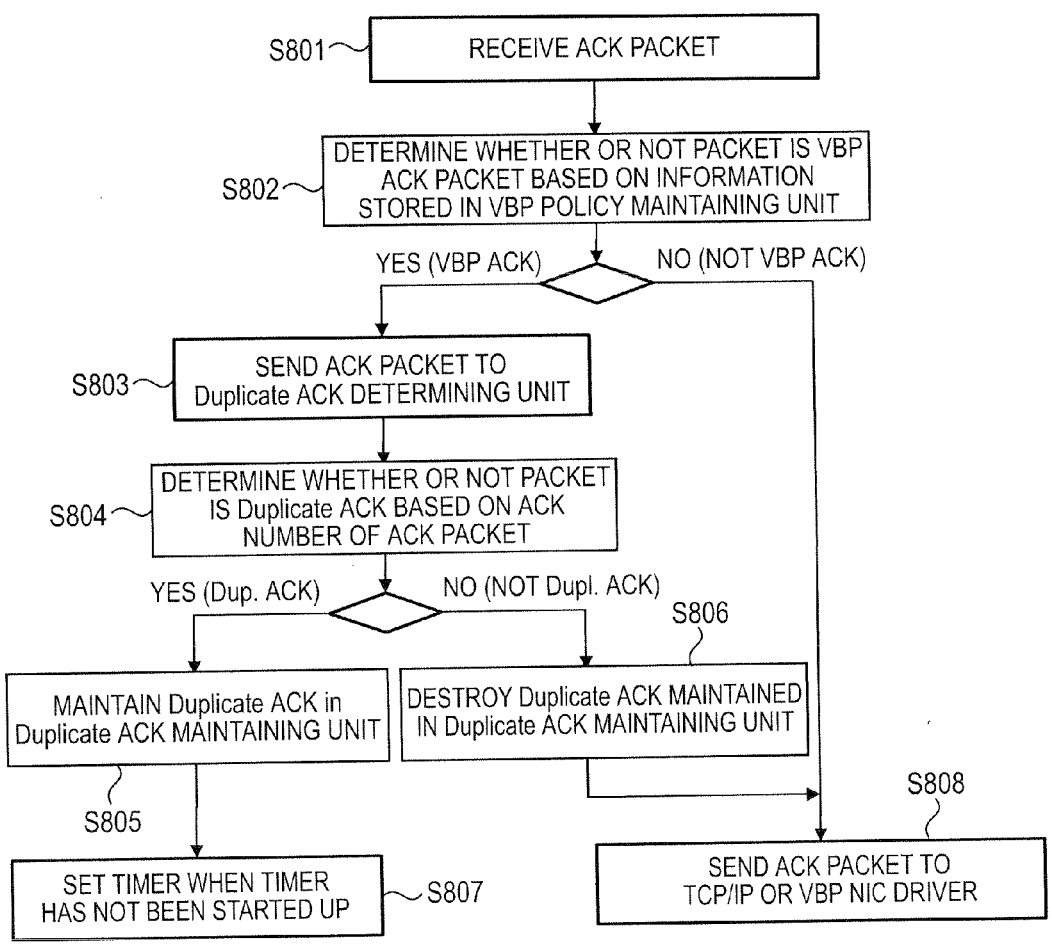
FIG. 8 is a flowchart illustrating the sequence of a Duplicate ACK integrating process performed when an ACK packet is received by the data transmission side (ACK reception side).

FIG. 8 illustrates, as a flowchart, the sequence of the Duplicate ACK integrating process of collecting a plurality of Duplicate ACK packets as one by using the functional configuration illustrated in FIG. 6 or 7 in a layer lower than that of the TCP/IP when the ACK packets are received by the data transmission side (ACK reception side).

The multi-link processing unit 606 performs a reception process for a plurality of packets, which are segmented from the same Conversation, distributed to a plurality of links in accordance with the VBP policy that is maintained in the VBP policy maintaining unit 604. When receiving the ACK packet received from the multi-link processing unit 606 (Step S801), the VBP packet determining unit 605 determines whether the packet is a packet for which the VBP process is performed (hereinafter, also referred to as a "VBP packet") based on the information maintained in the VBP policy maintaining unit 604, that is, the VBP policy (Step S802).

Here, whether or not a packet is a VBP packet represents the same as whether or not a packet is one of the packets acquired by segmenting the same Conversation. The Conversation is defined as a combination of an IP address and a port number. However, since multi-link transmission is performed in compliance with the limitation defined in "IEEE802.1 AX-2008 Link Aggregation", the transmission frame of the VBP packet is changed in accordance with a VBP policy as illustrated in Table 1 represented above. Accordingly, the determination process that is performed by the VBP packet determining unit 605 is the same as a process in which whether or not the plurality of received ACK packets are the VBP ACK packets acquired by segmenting the same Conversation by acquiring the original IP address and the port number by referring to the VBP policy.

In a case where the received ACK packet is not the VBP ACK packet (No in Step S802), the VBP packet determining unit 605 sends the corresponding ACK packet to a higher layer such as the TCP/IP, the VBP NIC driver, or the like (Step S808) and ends this process routine.

On the other hand, in a case where the received ACK packet is the VBP ACK packet (Yes in Step S802), the VBP packet determining unit 605 sends the corresponding ACK packet to the Duplicate ACK determining unit 602 (Step S803).

The Duplicate ACK determining unit 602 determines whether or not the corresponding ACK packet is a Duplicate ACK packet based on the ACK number included inside the ACK packet and the packet size (Step S804).

In a case where the received ACK packet is a Duplicate ACK packet (Yes in Step S804), the Duplicate ACK maintaining unit 601 maintains the corresponding ACK packet (Step S805). At this time, when the timer unit 603 has not started up the timer, the timer is set (Step S806).

On the other hand, in a case where the received ACK packet is not a Duplicate ACK packet (No in Step S804), the Duplicate ACK maintaining unit 601 destroys the maintained Duplicate ACK packet (Step S807), sends the ACK packet to a higher layer such as the TCP/IP or the VBP NIC driver (Step S808), and ends this process routine.

Figure 9:
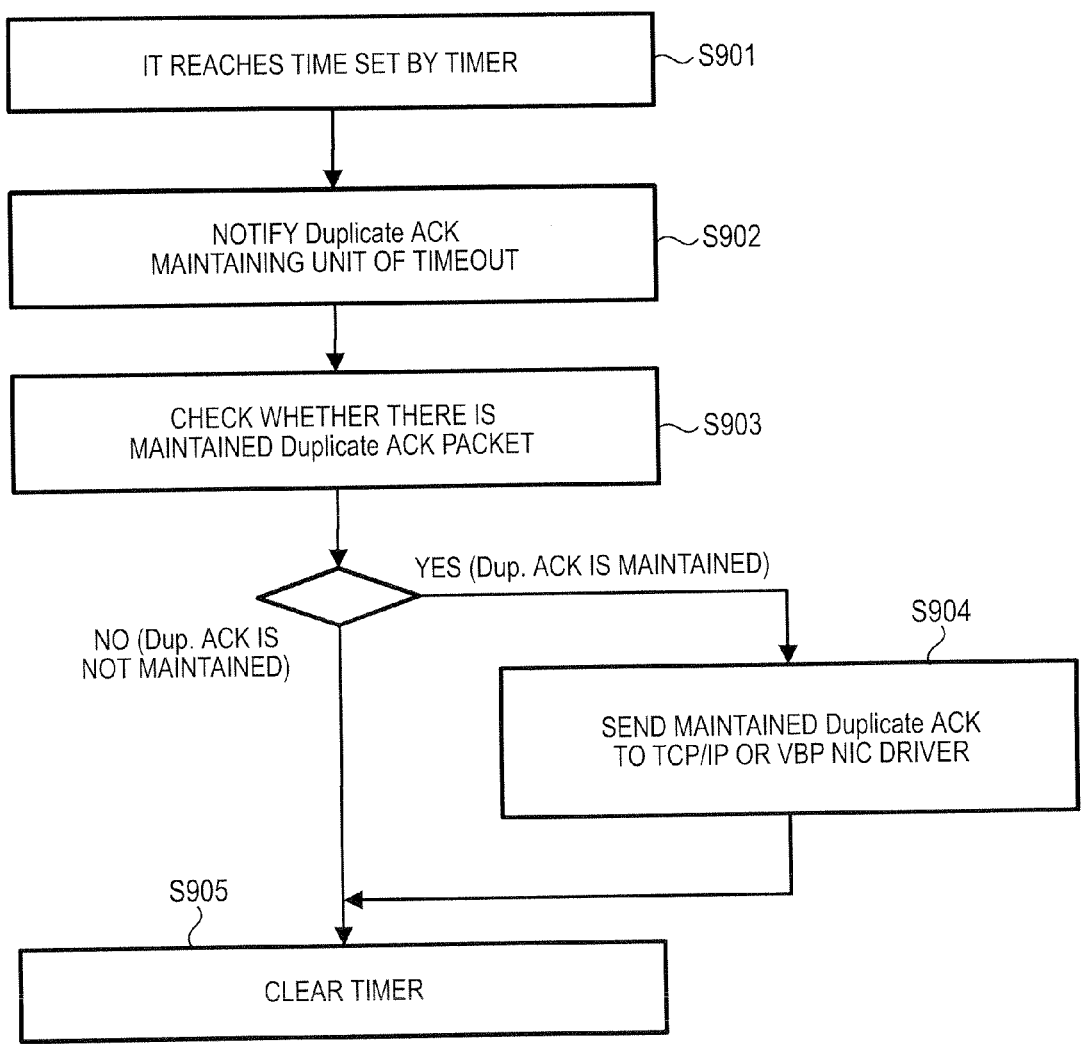
FIG. 9 is a flowchart illustrating the process sequence performed when a timer is timed out in a timer unit.

In FIG. 9, the process sequence performed when a timer is timed out in the timer unit 603 in the form of a flowchart.

When the timer reaches set time (Step S901), the timer unit 603 notifies the Duplicate ACK maintaining unit 601 of timeout (Step S902).

When the notification is received, the Duplicate ACK maintaining unit 601 checks whether there is a Duplicate ACK packet that is maintained (Step S903).

In a case where there is a maintained Duplicate ACK packet (Yes in Step S903), the Duplicate ACK maintaining unit 601 sends the Duplicate ACK packet to a higher layer such as the TCP/IP or the VBP NIC driver (Step S904). Then, the timer unit 603 clears the timer (Step S905).

On the other hand, in a case where there is no Duplicate ACK packet that is maintained by the Duplicate ACK maintaining unit 601 (No in Step S903), the timer unit 603 clears the timer (Step S905) and end this process routine.

According to the embodiments represented in FIGS. 6 to 9, in the second-layer network environment in which a frequent occurrence of the interchange of arrived packets in the order is predicted, by performing a Duplicate ACK integrating process in which collecting the Duplicate ACK packets as one on the data transmission side (the ACK reception side), the load of the network bandwidth due to transmission of an unnecessary retransmission packet can be reduced, and the load of the CPU due to processing of an unnecessary retransmission packet and a Duplicate ACK packet for the higher layer such as the TCP/IP can be reduced. Accordingly, an advantage of preventing the decrease in the performance of data transmission can be acquired. Furthermore, particularly in the VBP environment illustrated in FIGS. 1 to 4, while the advantage of realizing multi-links at the time of transmitting a single Conversation is acquired, the decrease in the data transmission speed due to an unnecessary retransmission packet and a Duplicate ACK packet can be prevented.

Subsequently, an embodiment will be described in which the Duplicate ACK function is added to the data reception side (the ACK transmission side).

Figure 10:
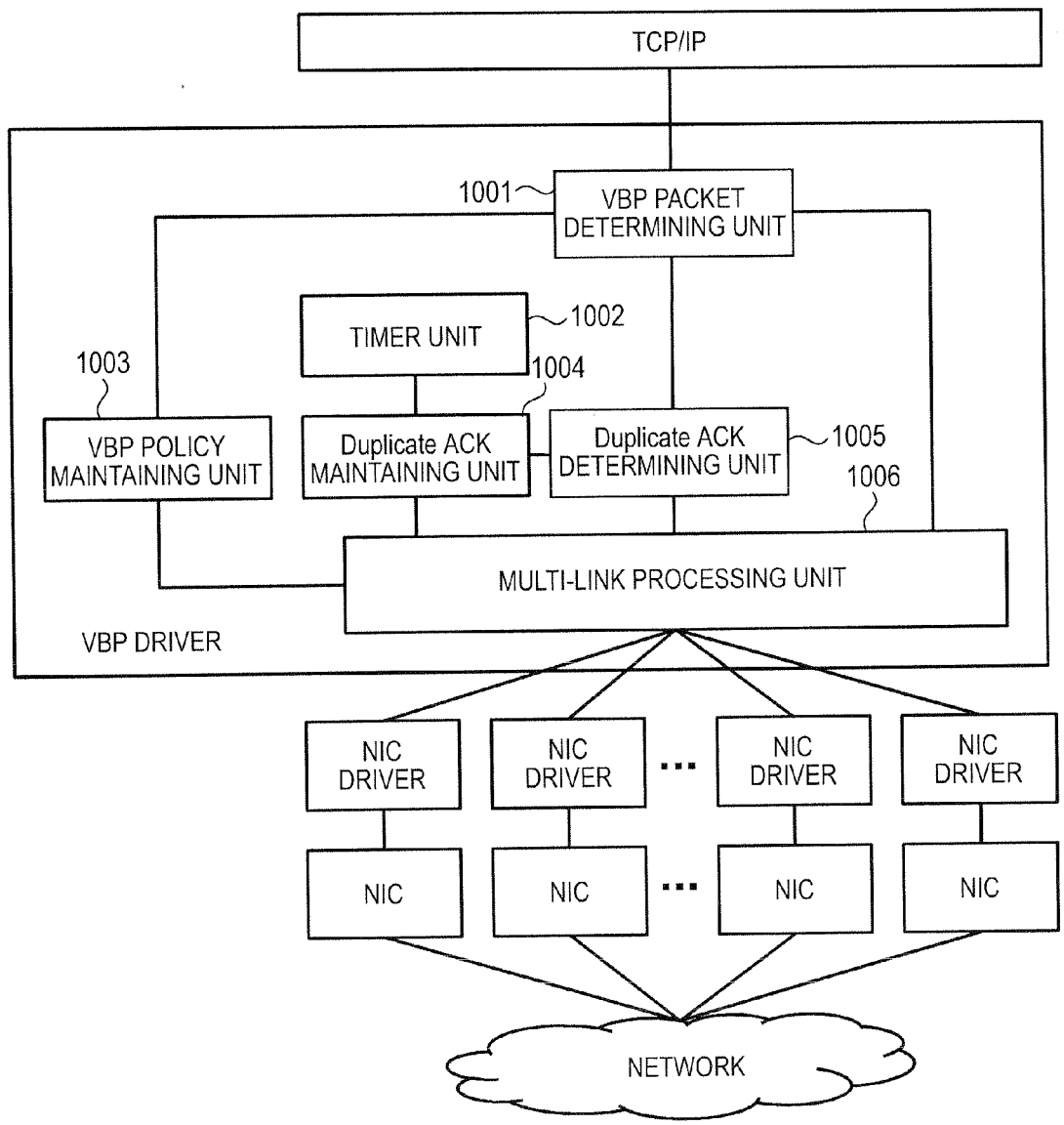
FIG. 10 is a diagram illustrating the functional configuration in which a Duplicate ACK integrating function is added to a reception-side (client) VBP driver.
Figure 11:
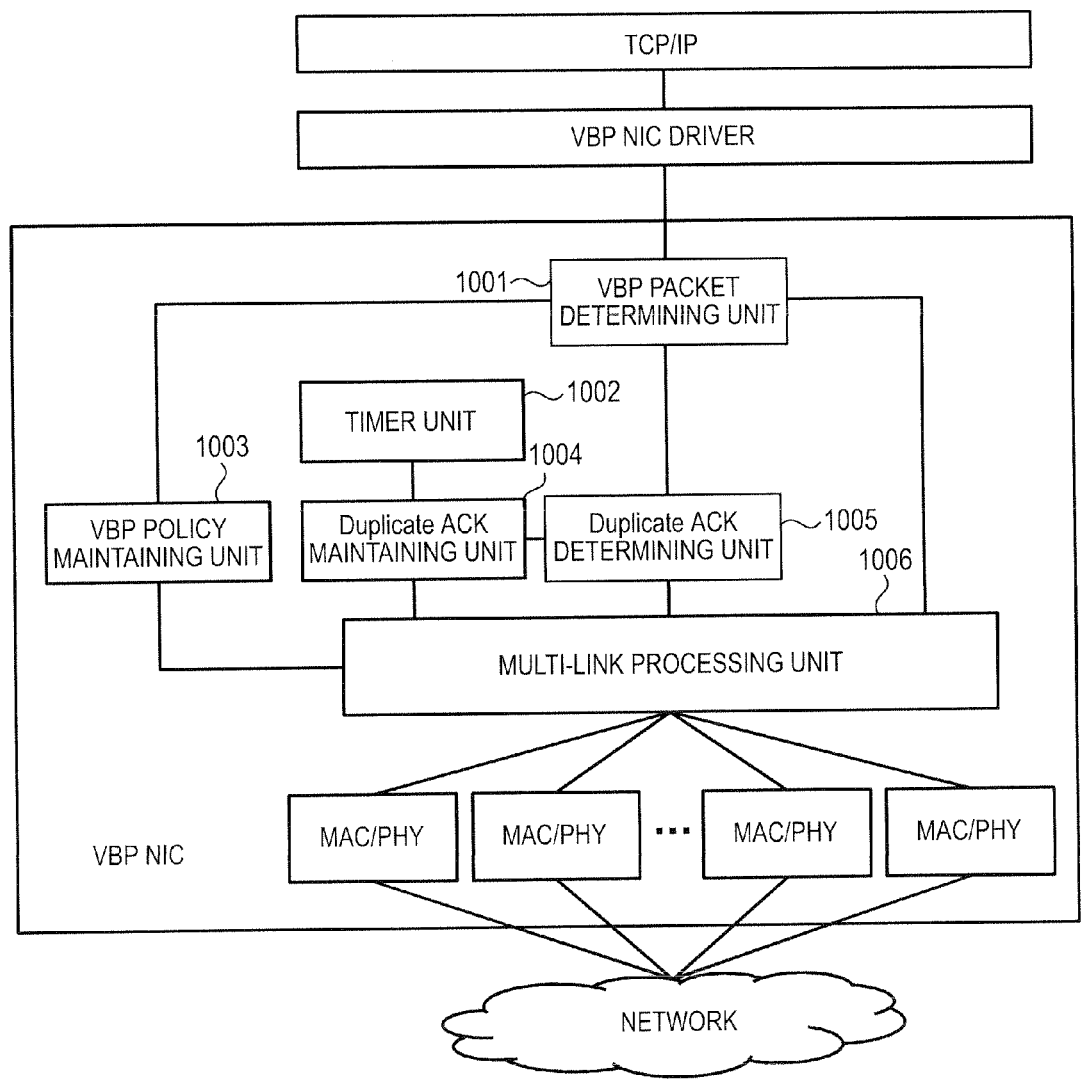
FIG. 11 is a diagram illustrating the functional configuration in which a Duplicate ACK integrating function is added to a reception-side (client) VBP NIC.

FIG. 10 illustrates the functional configuration in which a Duplicate ACK integrating function of collecting a plurality of Duplicate ACK packets as one is added to the VBP driver on the reception-side (client 60) in a case where the transmission frame control function is built in the form of a driver as illustrated in FIG. 3A. FIG. 11 illustrates the functional configuration in which the Duplicate ACK integrating function is added to the VBP NIC of the reception side (client 20) in a case where the transmission frame control function is built in the form of a network interface card as illustrated in FIG. 4A.

The VBP driver shown in FIG. 10 or the VBP NIC shown in FIG. 11 includes a VBP packet determining unit 1001, a timer unit 1002, a VBP policy maintaining unit 1003, a Duplicate ACK maintaining unit 1004, a Duplicate ACK determining unit 1005, and a multi-link processing unit 1006. In FIGS. 10 and 11, each of the functional modules denoted by reference numerals 1001 to 1006 basically performs the same operation, and a difference thereof is whether the functional module is realized by software or hardware.

Figure 12:
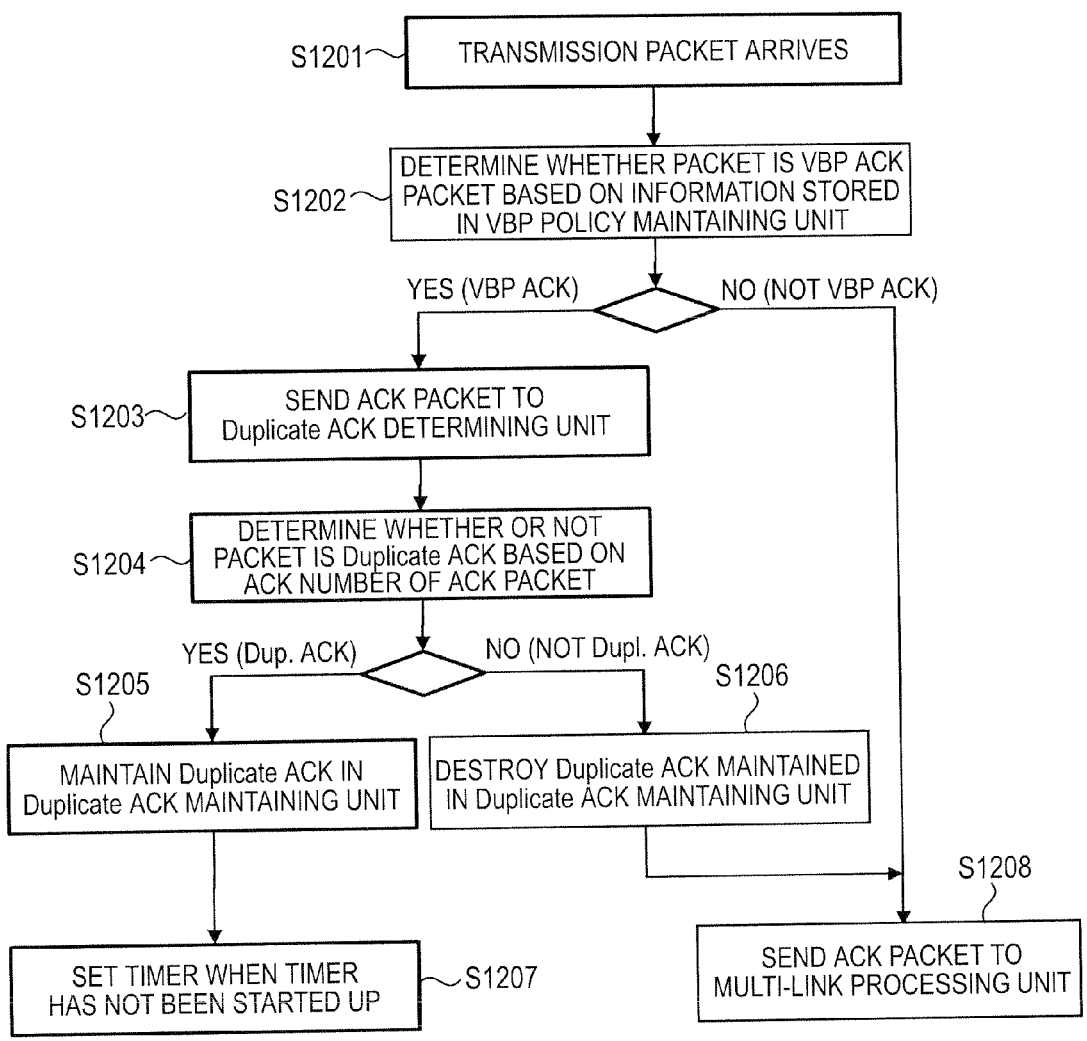
FIG. 12 is a flowchart illustrating the sequence of a Duplicate ACK integrating process performed when an ACK packet is transmitted by the data reception side (ACK transmission side).

In FIG. 12, the sequence of a Duplicate ACK integrating process of collecting a plurality of Duplicate ACK packets as one in a layer lower than the TCP/IP by using the functional configuration illustrated in FIG. 10 or 11 in a case where an ACK packet is transmitted by the data reception side (the ACK transmission side) is illustrated in the form of a flowchart.

When receiving an ACK packet from the higher layer such as the TCP/IP or the VBP NIC driver (Step S1201), the VBP packet determining unit 1001 determines whether or not the packet is a packet for which the VBP process is performed (hereinafter, also referred to as a "VBP packet) based on the information maintained by the VBP policy maintaining unit 1003, that is, the VBP policy (Step S1202).

In a case where the transmitted ACK packet is not a VBP packet (No in Step S1202), the VBP packet determining unit 1001 sends the corresponding ACK packet to the multi-link processing unit 1006 (Step S1208) and ends this process routine.

On the other hand, in a case where the transmitted ACK packet is a VBP packet (Yes in Step S1202), the VBP packet determining unit 1001 sends the corresponding ACK packet to the Duplicate ACK determining unit 1005 (Step S1203).

The Duplicate ACK determining unit 1005 determines whether or not the corresponding ACK packet is a Duplicate ACK packet based on the ACK number included inside the ACK packet and the packet size (Step S1204).

In a case where the received ACK packet is a Duplicate ACK packet (Yes in Step S1204), the Duplicate ACK maintaining unit 1004 maintains the corresponding ACK packet (Step S1205). At this time, when the timer unit 1002 has not started up the timer, the timer is set (Step S1206).

On the other hand, in a case where the received ACK packet is not a Duplicate ACK packet (No in Step S1204), the Duplicate ACK maintaining unit 1004 destroys the maintained Duplicate ACK packet (Step S1207), sends the ACK packet to the multi-link processing unit 1006 (Step S1208), and ends this process routine.

Figure 13:
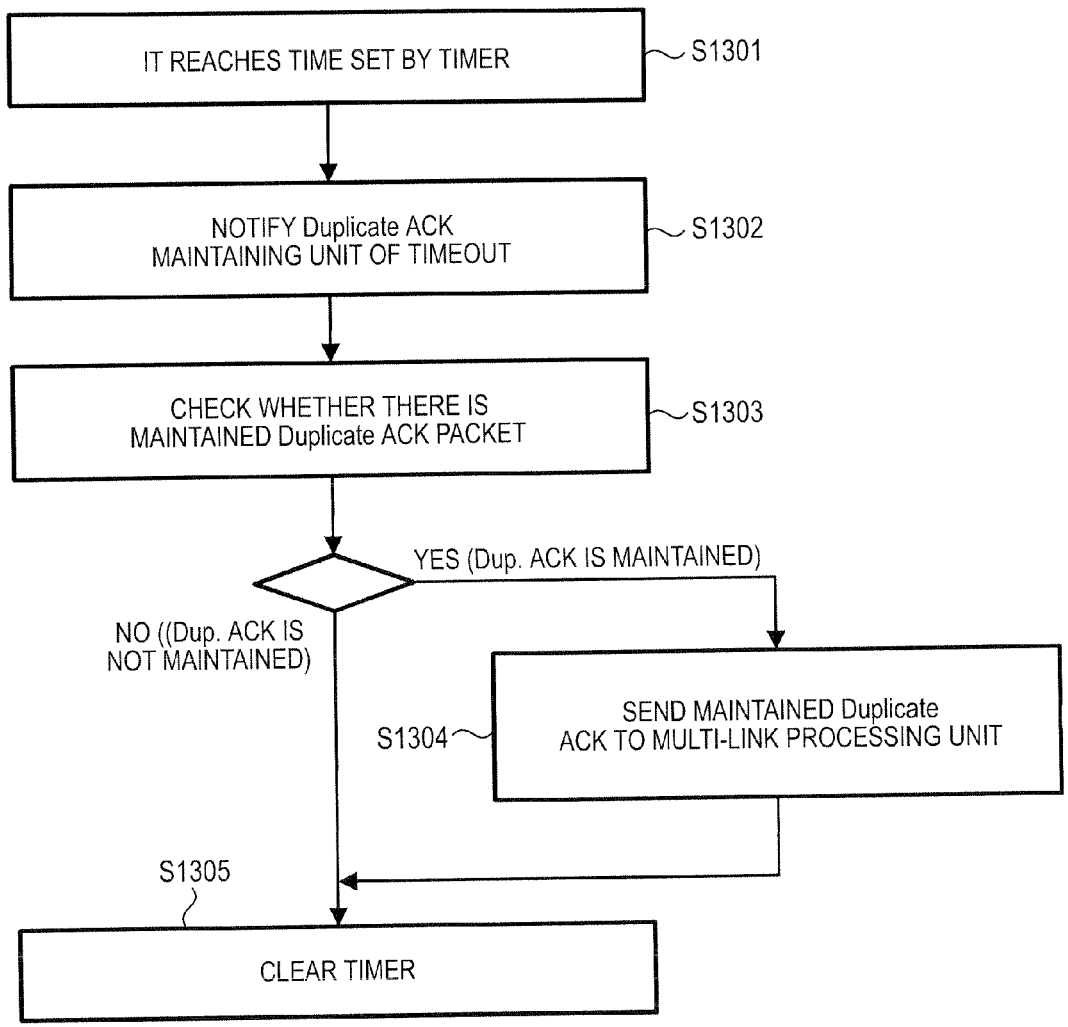
FIG. 13 is a flowchart illustrating the process sequence performed when a timer is timed out in a timer unit.

In FIG. 13, the process sequence performed when a timer is timed out in the timer unit 1002 is illustrated in the form of a flowchart.

When the timer reaches the set time (Step S1301), the timer unit 1002 notifies the Duplicate ACK maintaining unit 1004 of the timeout (Step S1302).

When receiving the notification, the Duplicate ACK maintaining unit 1004 checks whether or not there is a maintained Duplicate ACK packet (Step S1303).

In a case where there is a maintained Duplicate ACK (Yes in Step S1303), the Duplicate ACK maintaining unit 1004 sends the Duplicate ACK packet to the multi-link processing unit 1006 (Step S1304). Then, the timer unit 1002 clears the timer (Step S1305).

On the other hand, in a case where there is no Duplicate ACK packet that is maintained by the Duplicate ACK maintaining unit 1005 (No in Step S1303), the timer unit 1002 clears the timer (Step S1305) and ends this process routine.

According to the embodiments represented in FIGS. 10 to 13, in the second-layer network environment in which a frequent occurrence of the interchange of arrived packets in the order is predicted, by performing a Duplicate ACK integrating process in which collecting the Duplicate ACK packets as one on the data reception side (the ACK transmission side), the load of the network bandwidth due to transmission of an unnecessary retransmission packet and a Duplicate ACK packet can be reduced, and the load of the CPU due to processing of an unnecessary retransmission packet and a Duplicate ACK packet for the higher layer such as the TCP/IP can be reduced. Accordingly, an advantage of preventing the decrease in the performance of data transmission can be acquired. Furthermore, particularly in the VBP environment illustrated in FIGS. 1 to 4, while the advantage of realizing multi-links at the time of transmitting a single Conversation is acquired, the decrease in the data transmission speed due to an unnecessary retransmission packet and a Duplicate ACK packet can be prevented.

Subsequently, an embodiment will be described in which a packet sorting function is added to the data reception side (the ACK transmission side).

Figure 14:
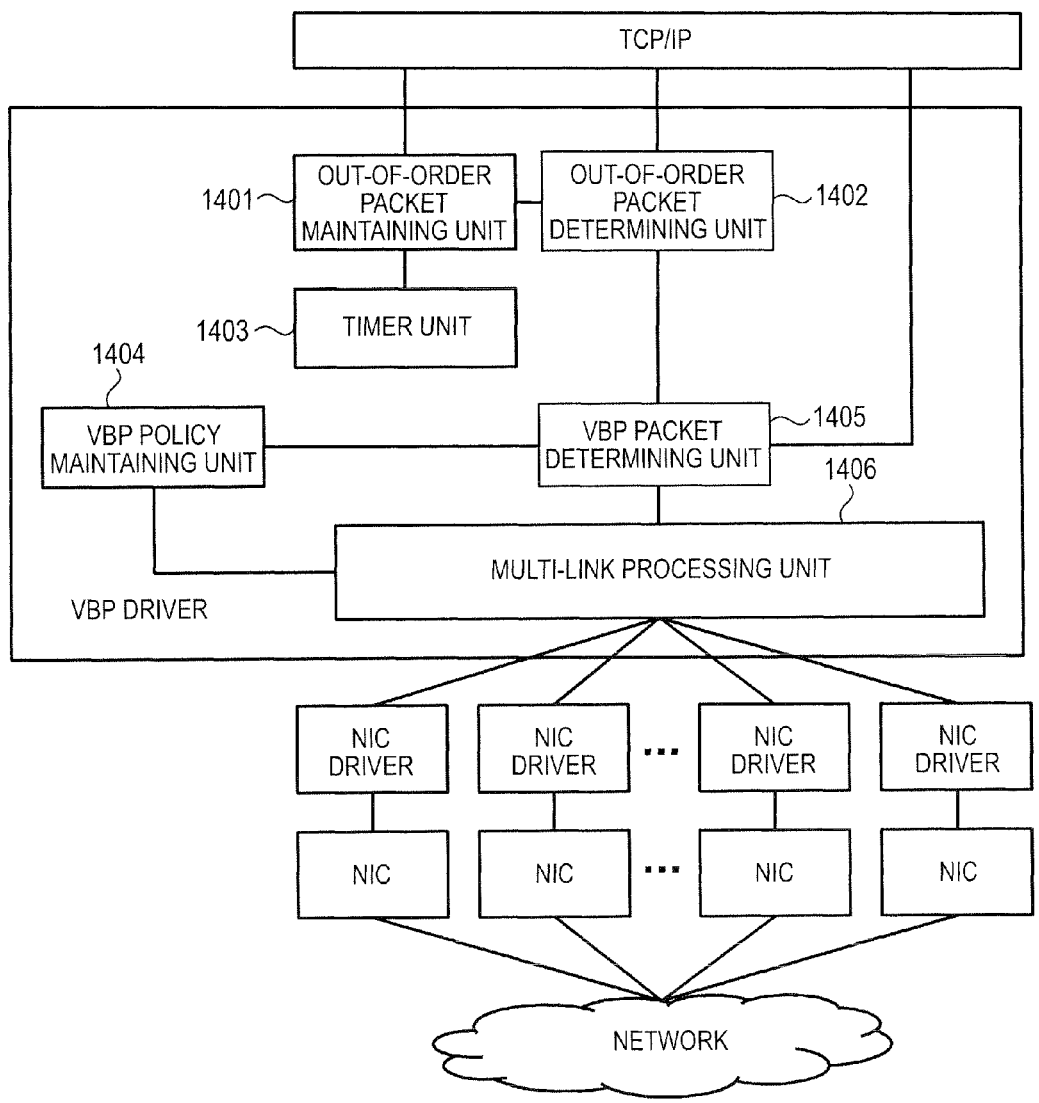
FIG. 14 is a diagram illustrating the functional configuration in which a packet sorting function is added to a reception-side (client) VBP driver.

In FIG. 14, the functional configuration is illustrated in which a packet sorting function of sorting the order of the received packets in an correct order is added to the VBP driver of the reception-side (client 60) in a case where the transmission frame control function is built in the form of a driver as illustrated in FIG. 3A. In addition, in FIG. 15, the functional configuration is illustrated in which a packet sorting function is added to the VBP NIC of the reception-side (client 60) in a case where the transmission frame control function is built in the form of a network interface card as represented in FIG. 4A.

Figure 15:
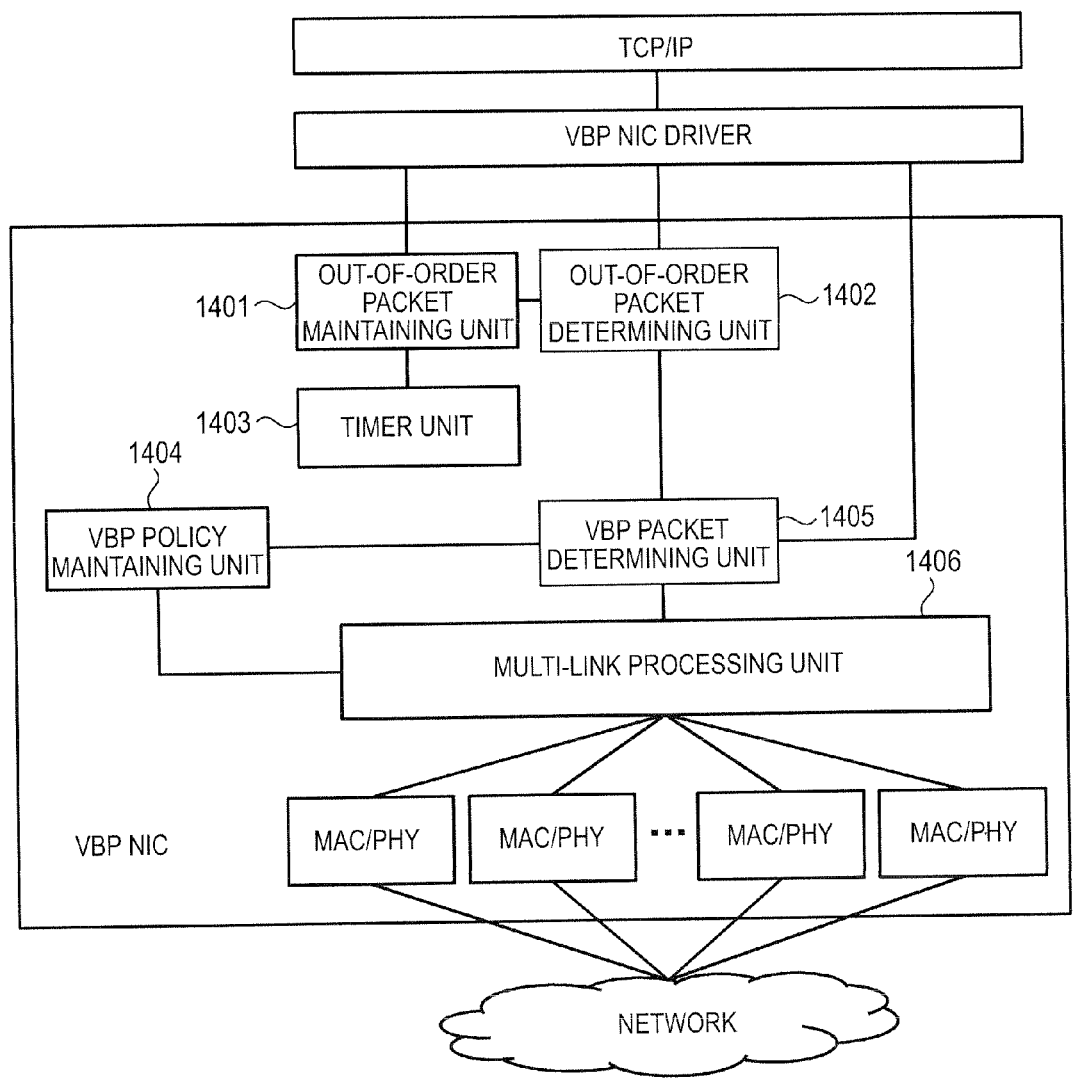
FIG. 15 is a diagram illustrating the functional configuration in which a packet sorting function is added to a reception-side (client) VBP NIC.

The VBP driver shown in FIG. 14 or the VBP NIC shown in FIG. 15 includes an out-of-order packet maintaining unit 1401, an out-of-order packet determining unit 1402, a timer unit 1403, a VBP policy maintaining unit 1404, a VBP packet determining unit 1405, and a multi-link processing unit 1406. In FIGS. 14 and 15, each of the functional modules denoted by reference numerals 1401 to 1606 basically performs the same operation, and there is only a difference in whether the function is realized in a software form or a hardware form.

Figure 16:
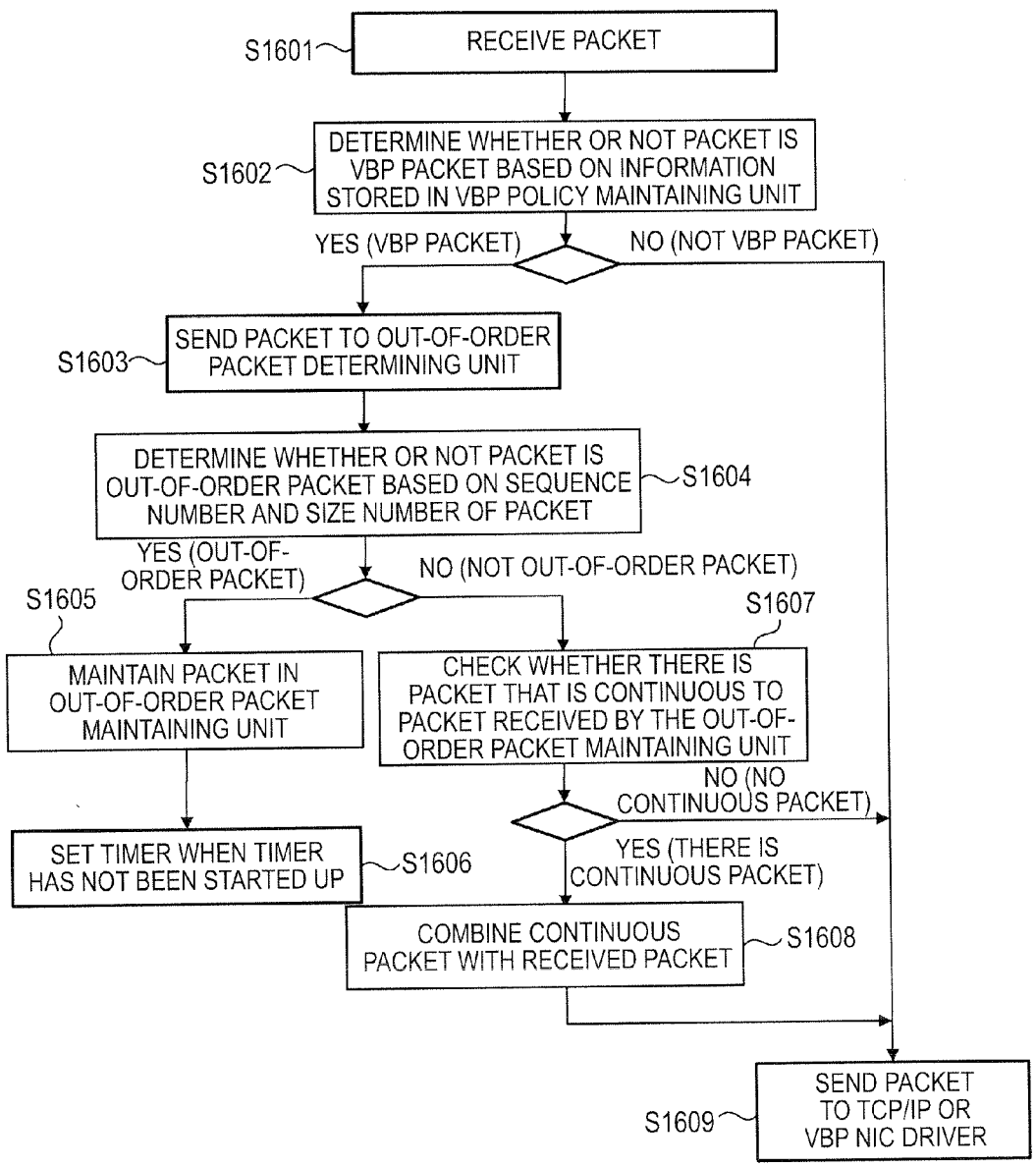
FIG. 16 is a flowchart illustrating the sequence of a packet sorting process performed on the data reception side (ACK transmission side).

FIG. 16 is a flowchart illustrating the sequence of a packet sorting process of sorting the received packets in a correct order that is performed in a layer lower than the TCP/IP on the data reception side (ACK transmission side) by using the functional configuration shown in FIG. 14 or 15.

The multi-link processing unit 606 performs a reception process for a plurality of packets, which are segmented from the same Conversation, distributed to a plurality of links in accordance with the VBP policy that is maintained in the VBP policy maintaining unit 604. When receiving the received packet from the multi-link processing unit 1406 (Step S1601), the VBP packet determining unit 1405 determines whether the packet is a packet for which the VBP process is performed (hereinafter, also referred to as a "VBP packet") based on the information maintained in the VBP policy maintaining unit 1404, that is, the VBP policy (Step S1602).

In a case where the received packet is not the VBP packet (No in Step 1602), the VBP packet determining unit 1405 sends the corresponding received packet to a higher layer such as the TCP/IP, the VBP NIC driver, or the like (Step S1609) and ends this process routine.

On the other hand, in a case where the received packet is the VBP packet (Yes in Step S1602), the VBP packet determining unit 1405 sends the corresponding received packet to the out-of-order packet determining unit 1402 (Step S1603).

The out-of-order packet determining unit 1402 determines whether or not the corresponding received packet is an out-of-order packet (a packet of which the arrival is not in order) (Step S1604).

In a case where the received packet is an out-of-order packet (Yes in Step S1604), the out-of-order packet maintaining unit 1701 maintains the corresponding received packet (Step S1605). At this time, when the timer unit 1703 has not started up the timer, the timer is set (Step S1606).

On the other hand, in case where the received packet is not an out-of-order packet (No in Step S1604), the out-of-order packet maintaining unit 1701 checks whether or not a packet of which the sequence number is continuous to the corresponding received packet is maintained (Step S1607).

In a case where the packet of which the sequence number is continuous to that of the received packet is not maintained by the out-of-order packet maintaining unit 1401 (No in Step S1607), the out-of-order packet determining unit 1402 sends the corresponding received packet to a higher layer such as the TCP/IP or the VBP NIC driver (Step S1609) and ends this process routine.

On the other hand, in a case where the packet of which the sequence number is continuous to that of the received packet is maintained (Yes in Step S1607), the out-of-order packet maintaining unit 1401 combines received packets of which the sequence numbers are continuous to each other (Step S1608) and sends the combined packets to a higher layer such as the TCP/IP or the VBP NIC driver (Step S1609).

Figure 17:
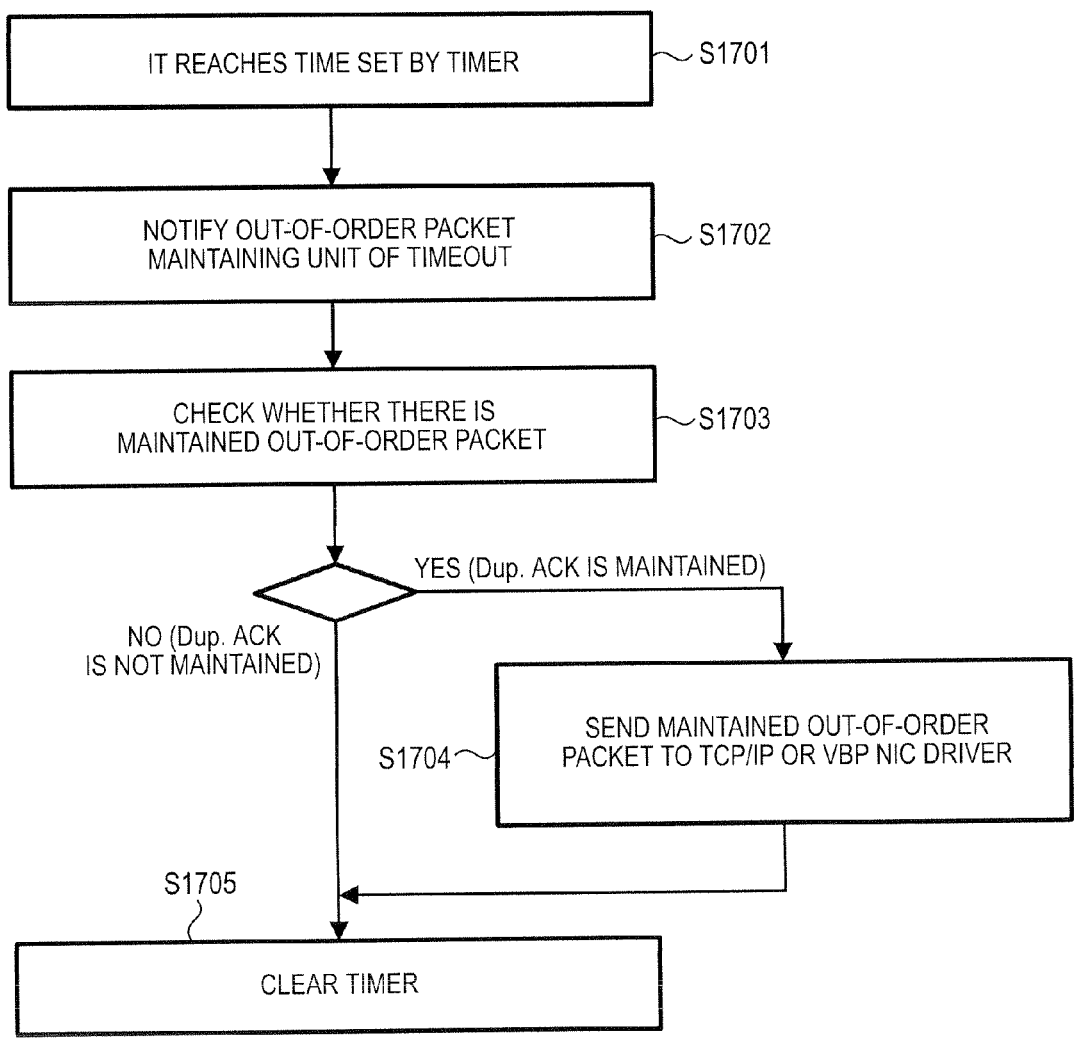
FIG. 17 is a flowchart illustrating the process sequence performed when a timer is timed out in a timer unit.

In FIG. 17, the process sequence performed when the timer is timed out in the timer unit 1403 is illustrated in the form of a flowchart.

When the timer reaches set time (Step S1701), the timer unit 1403 notifies the out-of-order packet maintaining unit 1401 of timeout (Step S1702).

When the notification is received, the out-of-order packet maintaining unit 1401 checks whether or not an out-of-order packet (a packet of which the arrival is not in order) is maintained (Step S1703).

In a case where there is a maintained out-of-order packet (Yes in Step S1703), the out-of-order packet maintaining unit 1401 sends the out-of-order packet to a higher layer such as the TCP/IP or the VBP NIC driver (Step S1704).

Then, the timer unit 1403 clears the timer (Step S1705) and ends this process routine.

According to the embodiments represented in FIGS. 14 to 17, in the second-layer network environment in which a frequent occurrence of the interchange of arrived packets in the order is predicted, by performing a packet sorting process on the data reception side (the ACK transmission side), the load of the network bandwidth due to transmission of an unnecessary retransmission packet and a Duplicate ACK packet can be reduced, and the load of the CPU due to processing of an unnecessary retransmission packet and a Duplicate ACK packet for the higher layer such as the TCP/IP can be reduced. Accordingly, an advantage of preventing the decrease in the performance of data transmission can be acquired. Furthermore, particularly in the VBP environment illustrated in FIGS. 1 to 4, while the advantage of realizing multi-links at the time of transmitting a single Conversation is acquired, the decrease in the data transmission speed due to an unnecessary retransmission packet and a Duplicate ACK packet can be prevented.

As above, the embodiments of the present invention have been described in detail. However, it is apparent that the embodiments may be modified or changed by those skilled in the art within the scope not departing from the concept of the present invention.

In the description presented here, as an example of the second-layer network environment in which the frequent occurrence of interchange of arrived packets in the order is predicted, a network environment in which multi-links are performed through the VBP has been described. However, the concept of the present invention is not limited thereto. In addition, the range to which an embodiment of the present invention is applied is not limited to the second-layer network, and an embodiment of the invention can be appropriately applied to another network environment in which a packet loss is rare, but a frequent occurrence of the interchange of arrived packets is predicted.

To be brief, since the present invention has been disclosed in the exemplary forms, the description presented here should not considered for purposes of limitation. In order to determine the concept of the present invention, the claims should be referred to.

The present application contains subject matter related to that disclosed in Japanese Priority Patent Application JP 2010-121326 filed in the Japan Patent Office on May 27, 2010, the entire contents of which is hereby incorporated by reference.

What is claimed is:

1. A communication apparatus comprising:
a higher-layer processing unit operable to start up a retransmission process of a packet from a plurality of packets, segmented from a conversation, in accordance with reception of a duplicate acknowledgement (ACK) packet, wherein the plurality of packets are transferred to a network through a plurality of communication links and wherein the plurality of packets are distributed amongst the plurality of communication links based on a predefined transmission control policy corresponding to the conversation; and
a lower-layer processing unit operable to collect a plurality of duplicate ACK packets, received through the network, as one duplicate ACK packet and send the one duplicate ACK packet to the higher-layer processing unit.

2. The communication apparatus according to claim 1, wherein the lower-layer processing unit is operable to collect the plurality of duplicate ACK packets, of which original IP addresses and port numbers are same, for plurality of packets segmented from the conversation.

3. The communication apparatus according to claim 1, wherein when receiving the plurality of duplicate ACK packets, the lower-layer processing unit is operable to start a timer and collect the plurality of duplicate ACK packets received until the timer is timed out.

4. A communication method for a communication apparatus, the communication method comprising:
in a lower-layer processing unit:
receiving a plurality of duplicate acknowledgement (ACK) packets through a network;
collecting the plurality of duplicate ACK packets as one duplicate ACK packet; and
sending the one duplicate ACK packet to a higher-layer processing unit, wherein the higher-layer processing unit is operable to start up a retransmission process of a packet from a plurality of packets, segmented from a conversation, in accordance with reception of the one duplicate ACK packet and wherein the plurality of packets are transferred to the network through a plurality of communication links and wherein the plurality of packets are distributed amongst the plurality of communication links based on a predefined transmission control policy corresponding to the conversation.

5. A non-transitory computer readable medium having stored thereon, a computer program having at least one code section executable by a computer, thereby causing the computer to perform the steps:
in a lower-layer processing unit in a communication apparatus:
receiving a plurality of duplicate acknowledgement (ACK) packets from a network;
collecting the plurality of duplicate ACK packets as one duplicate ACK packet; and
sending the one duplicate ACK packet to a higher-layer processing unit in the communication apparatus, wherein the higher-layer processing unit is operable to start up a retransmission process of a packet from a plurality of packets, segmented from a conversation, in accordance with reception of the one duplicate ACK packet and wherein the plurality of packets are transferred to the network through a plurality of communication links and wherein the plurality of packets are distributed amongst the plurality of communication links based on a predefined transmission control policy corresponding to the conversation.

6. A communication apparatus comprising:
a higher-layer processing unit operable to generate a duplicate acknowledgement (ACK) packet in accordance with reception of an out-of-order packet from a plurality of packets segmented from a conversation, wherein the plurality of packets are received from a network through a plurality of communication links and wherein the plurality of packets are distributed amongst the plurality of communication links based on a predefined transmission control policy corresponding to the conversation; and
a lower-layer processing unit operable to collect a plurality of duplicate ACK packets, received from the higher-layer processing unit, as one duplicate ACK packet and send the one duplicate ACK packet to the network.

7. The communication apparatus according to claim 6, wherein the lower-layer processing unit is operable to collect the plurality of duplicate ACK packets, of which original IP addresses and port numbers are same, for plurality of packets segmented from the conversation.

8. The communication apparatus according to claim 6, wherein when receiving the plurality of duplicate ACK packets from the higher-layer processing unit, the lower-layer processing unit is operable to start a timer, and collect the plurality of duplicate ACK packets received until the timer is timed out.

9. A communication method for a communication apparatus the communication method comprising:
in a lower-layer processing unit:
receiving a plurality of duplicate acknowledgement (ACK) packets from a higher-layer processing unit;
collecting the plurality of duplicate ACK packets as one duplicate ACK packet and;
transmitting the one duplicate ACK packet to a network, wherein the higher-layer processing unit is operable to generate a duplicate ACK packet in accordance with reception of an out-of-order packet from a plurality of packets segmented from a conversation, wherein the plurality of packets are received from the network through a plurality of communication links and wherein the plurality of packets are distributed amongst the plurality of communication links based on a predefined transmission control policy corresponding to the conversation.

10. A non-transitory computer readable medium having stored thereon, a computer program having at least one code section executable by a computer, thereby causing the computer to perform the steps:
in a lower-layer processing unit in a communication apparatus:
receiving a plurality of duplicate acknowledgement (ACK) packets from a higher-layer processing unit in the communication apparatus;
collecting the plurality of duplicate ACK packets as one duplicate ACK packet and;
transmitting the one duplicate ACK packet to a network, wherein the higher-layer processing unit is operable to generate a duplicate ACK packet in accordance with reception of an out-of-order packet from a plurality of packets segmented from a conversation, wherein the plurality of packets are received from the network through a plurality of communication links and wherein the plurality of packets are distributed amongst the plurality of communication links based on a predefined transmission control policy corresponding to the conversation.

11. A communication apparatus comprising:
a higher-layer processing unit operable to generate a duplicate acknowledgement (ACK) packet in accordance with reception of an out-of-order packet from a plurality of packets segmented from a conversation; and
a lower-layer processing unit operable to sort the plurality of packets received through a network in a correct order and send the sorted packets to the higher-layer processing unit, wherein the plurality of packets are received from the network through a plurality of communication links and wherein the plurality of packets are distributed amongst the plurality of communication links based on a predefined transmission control policy corresponding to the conversation.

12. The communication apparatus according to claim 11, wherein the plurality of packets, of which original IP addresses and port numbers are same, segmented from the conversation are out of order.

13. The communication apparatus according to claim 11, wherein when receiving a plurality of out-of-order packets, the lower-layer processing unit is operable to start up a timer, maintain the plurality of out-of-order packets until the timer is timed out, and sort the plurality of out-of-order packets in a correct order.

14. A communication method for a communication apparatus the communication method comprising the steps of:
in a lower-layer processing unit:
receiving an out-of-order packet from a plurality of packets, segmented from a conversation, from a network through a plurality of communication links, wherein the plurality of packets are distributed amongst the plurality of communication links based on a predefined transmission control policy corresponding to the conversation;
sorting the plurality of packets in a correct order; and
sending the sorted plurality of packets to a higher-layer processing unit, wherein the higher-layer processing unit is operable to generate a duplicate acknowledgement (ACK) packet in accordance with reception of the out-of-order packet by the lower-layer processing unit.

15. A non-transitory computer readable medium having stored thereon, a computer program having at least one code section executable by a computer, thereby causing the computer to perform the steps:
in a lower-layer processing unit in a communication apparatus:
receiving an out-of-order packet from a plurality of packets, segmented from a conversation, from a network through a plurality of communication links, wherein the plurality of packets are distributed amongst the plurality of communication links based on a predefined transmission control policy corresponding to the conversation;
sorting the plurality of packets in a correct order; and
sending the sorted plurality of packets to a higher-layer processing unit, wherein the higher-layer processing unit is operable to generate a duplicate acknowledgement (ACK) packet in accordance with reception of the out-of-order packet by the lower-layer processing unit.

* * * * *